(12) United States Patent
Inoue et al.

(10) Patent No.: US 8,775,730 B2
(45) Date of Patent: Jul. 8, 2014

(54) STORAGE APPARATUS AND METHOD FOR ARRANGING STORAGE AREAS AND MANAGING ERROR CORRECTING CODE (ECC) GROUPS

(75) Inventors: Shintaro Inoue, Odawara (JP); Yutaka Takata, Ninomiya (JP); Mikio Fukuoka, Odawara (JP); Eiju Katsuragi, Odawara (JP)

(73) Assignee: Hitachi, Ltd., Tokyo (JP)

( * ) Notice: Subject to any disclaimer, the term of this patent is extended or adjusted under 35 U.S.C. 154(b) by 824 days.

(21) Appl. No.: 12/010,293

(22) Filed: Jan. 23, 2008

(65) Prior Publication Data

US 2008/0235448 A1   Sep. 25, 2008

(30) Foreign Application Priority Data

Mar. 19, 2007 (JP) ................................. 2007-070826

(51) Int. Cl.
G06F 3/06 (2006.01)
(52) U.S. Cl.
CPC .............. *G06F 3/061* (2013.01); *G06F 3/0647* (2013.01); *G06F 3/0665* (2013.01); *G06F 3/0689* (2013.01)
USPC .......................................... 711/114; 711/165
(58) Field of Classification Search
None
See application file for complete search history.

(56) References Cited

U.S. PATENT DOCUMENTS

| 5,392,244 | A   | * | 2/1995  | Jacobson et al. ............. 711/114 |
| 5,584,018 | A   | * | 12/1996 | Kamiyama ................... 711/165 |
| 5,893,139 | A   |   | 4/1999  | Kamiyama |
| 6,275,898 | B1  | * | 8/2001  | DeKoning .................... 711/114 |
| 6,526,478 | B1  | * | 2/2003  | Kirby ............................ 711/114 |
| 6,779,078 | B2  | * | 8/2004  | Murotani et al. ............. 711/112 |
| 6,816,957 | B1  | * | 11/2004 | Halladay et al. ............. 711/170 |
| 7,774,572 | B2  |   | 8/2010  | Yokohata et al. |
| 2004/0044698 | A1 | * | 3/2004  | Ebata et al. ................... 707/200 |
| 2005/0091455 | A1 |   | 4/2005  | Kano et al. |
| 2005/0193167 | A1 | * | 9/2005  | Eguchi et al. ................ 711/114 |
| 2006/0047923 | A1 | * | 3/2006  | Kodama ....................... 711/161 |
| 2006/0059301 | A1 | * | 3/2006  | Sugino et al. ................ 711/113 |
| 2006/0224844 | A1 | * | 10/2006 | Kano et al. ................... 711/162 |
| 2007/0118689 | A1 | * | 5/2007  | Hyde et al. ................... 711/114 |
| 2008/0216086 | A1 | * | 9/2008  | Tanaka et al. ................ 718/105 |
| 2011/0060885 | A1 | * | 3/2011  | Satoyama et al. ........... 711/170 |

FOREIGN PATENT DOCUMENTS

| JP | 09-044381 A  | 2/1997 |
| JP | 09-223047 A  | 8/1997 |
| JP | 2003-015915  | 7/2001 |
| JP | 2005-050303 A | 2/2005 |
| JP | 2006-133951 A | 5/2006 |

OTHER PUBLICATIONS

David A. Patterson, Garth Gibson, and Randy H. Katz. "A Case for Redundant Arrays of Inexpensive Disks (RAID)." 1988. ACM. SIGMOD.*

(Continued)

*Primary Examiner* — Nathan Sadler
(74) *Attorney, Agent, or Firm* — Volpe and Koenig, P.C.

(57) ABSTRACT

This storage apparatus for providing a dynamically expandable virtual volume to a host system to access the virtual volume comprises an allocation unit for configuring a group with a plurality of disks for providing a storage area to be allocated to the virtual volume, and allocating the storage area respectively from a plurality of the groups to the virtual volume; and a storage area arrangement unit for rearranging the storage area in each of the groups being used by the virtual volume to become optimal among each of the groups based on external operation.

18 Claims, 38 Drawing Sheets

(56) References Cited

OTHER PUBLICATIONS

Gerhard Weikum, Peter Zabback, and Peter Scheuermann. "Dynamic File Allocation in Disk Arrays." 1991. ACM. SIGMOD.*

Yoshiko Yasuda, Shinichi Kawamoto, Atsushi Ebata, Jun Okitsu, and Tatsuo Higuchi. "Concept and Evaluation of X-NAS: a Highly Scalable NAS System." Apr. 2003. IEEE. MSS'03.*

* cited by examiner

FIG.4

VIRTUAL VOL CONFIGURATION INFORMATION TABLE (21)

| INDEX | VIRTUAL VOL ID | VIRTUAL VOL SIZE | ALLOCATED PAGE COUNT | ECCG USED PAGE COUNT | | |
|---|---|---|---|---|---|---|
| | | | | ECCG#1 | ECCG#2 | ECCG#3 |
| 0 | 100 | 6 | 5 | 4 | 1 | 0 |
| 1 | 101 | 4 | 3 | 1 | 0 | 2 |

VIRTUAL VOL ADDRESS INFORMATION TABLE (22)

| VOL# | VIRTUAL VOLUME INTERNAL PAGE ID | ECCG ID | ECCG INTERNAL PAGE ID |
|---|---|---|---|
| 100 | 0 | 1 | 0 |
| 100 | 1 | 1 | 1 |
| 100 | 2 | FFFF | FFFF |
| 100 | 3 | 2 | 0 |
| 100 | 4 | 1 | 2 |
| 100 | 5 | 1 | 4 |
| 101 | 0 | 1 | 3 |
| 101 | 1 | 3 | 1 |
| 101 | 2 | FFFF | FFFF |
| 101 | 3 | 3 | 0 |

ECCG CONFIGURATION INFORMATION TABLE 23

| ECCG ID | START PAGE ID | END PAGE ID | TOTAL PAGE COUNT | USED PAGE COUNT | HDD TYPE |
|---------|---------------|-------------|------------------|-----------------|----------|
| 1 | 0 | 5 | 6 | 5 | A |
| 2 | 6 | 9 | 4 | 1 | A |
| 3 | 10 | 14 | 5 | 2 | A |
| 23A | 23B | 23C | 23D | 23E | 23F |

FIG.7

ECCG PAGE CONFIGURATION INFORMATION TABLE 24

| PAGE ID | ECCG ID | ECCG INTERNAL PAGE ID | ALLOCATION DESTINATION VIRTUAL VOLUME ID | ALLOCATION DESTINATION PAGE ID | LAST ACCESS TIME |
|---|---|---|---|---|---|
| 0 | 1 | 0 | 100 | 0 | 11111111 |
| 1 | 1 | 1 | 100 | 1 | 22222222 |
| 2 | 1 | 2 | 100 | 4 | 88888888 |
| 3 | 1 | 3 | 101 | 0 | 77777777 |
| 4 | 1 | 4 | 100 | 5 | 33333333 |
| 5 | 1 | 5 | FFFF | FFFF | FFFF |
| 6 | 2 | 0 | 100 | 3 | 44444444 |
| 7 | 2 | 1 | FFFF | FFFF | FFFF |
| 8 | 2 | 2 | FFFF | FFFF | FFFF |
| 9 | 2 | 3 | FFFF | FFFF | FFFF |
| 10 | 3 | 0 | 101 | 3 | 66666666 |
| 11 | 3 | 1 | 101 | 1 | 55555555 |
| 12 | 3 | 2 | FFFF | FFFF | FFFF |
| 13 | 3 | 3 | FFFF | FFFF | FFFF |
| 14 | 3 | 4 | FFFF | FFFF | FFFF |
| 24A | 24B | 24C | 24D | 24E | 24F |

FIG.8

ACCESS LOG INFORMATION TABLE 25

| ACCESS TIME | ECCG ID | ECCG INTERNAL PAGE ID |
|---|---|---|
| 11111111 | 1 | 0 |
| 22222222 | 1 | 1 |
| 33333333 | 1 | 4 |
| 44444444 | 2 | 0 |
| 55555555 | 3 | 1 |
| 66666666 | 3 | 0 |
| 77777777 | 1 | 3 |
| 88888888 | 1 | 2 |

| ACCESS TIME | ECCG ID | ECCG INTERNAL PAGE ID |
|---|---|---|
| 11111111 | 1 | 0 |
| 22222222 | 1 | 1 |
| 33333333 | 1 | 4 |
| 44444444 | 2 | 0 |
| 55555555 | 3 | 1 |
| 66666666 | 3 | 0 |
| 77777777 | 1 | 3 |
| 88888888 | 1 | 2 |

PAGES ACCESSED WITHIN Tx

RELATIONSHIP OF PAGE ACCESSED WITHIN Tx AND ECCG (1) CREATE ACCESS PAGE OPTIMAL ARRANGEMENT TABLE  32

| ECCG USED PAGE COUNT | | |
|---|---|---|
| ECCG#1 | ECCG#2 | ECCG#3 |
| 2 | 0 | 2 |

(2) SORT  32

| ECCG USED PAGE COUNT | | |
|---|---|---|
| ECCG#1 | ECCG#3 | ECCG#2 |
| 2 | 2 | 0 |

(3) COMPARE LEFT END AND RIGHT END  32

| ECCG USED PAGE COUNT | | |
|---|---|---|
| ECCG#1 | ECCG#3 | ECCG#2 |
| 2 | 2 | 0 |

(4) MIGRATE — MIGRATE ONE PAGE  32

| ECCG USED PAGE COUNT | | |
|---|---|---|
| ECCG#1 | ECCG#3 | ECCG#2 |
| 1 | 2 | 1 |

(5) REPEAT (2) TO (4)  32

| ECCG USED PAGE COUNT | | |
|---|---|---|
| ECCG#3 | ECCG#1 | ECCG#2 |
| 2 | 1 | 1 |

REPEAT UNTIL LEFT END (MAXIMUM) = RIGHT END (MINIMUM) + 1

FIG.17

(1) CREATE EMPTY PAGE OPTIMAL ARRANGEMENT TABLE    23

| ECCG ID | START PAGE ID | END PAGE ID | TOTAL PAGE COUNT | USED PAGE COUNT | HDD TYPE |
|---|---|---|---|---|---|
| 1 | 0 | 5 | 6 | 5 | A |
| 2 | 6 | 9 | 4 | 1 | A |
| 3 | 10 | 14 | 5 | 2 | A |

RELATIONSHIP OF EMPTY PAGE AND ECCG    33

| ECCG USED PAGE COUNT | | |
|---|---|---|
| ECCG#1 | ECCG#2 | ECCG#3 |
| 1 | 3 | 3 |

(2) SORT    33

| ECCG USED PAGE COUNT | | |
|---|---|---|
| ECCG#2 | ECCG#3 | ECCG#1 |
| 3 | 3 | 1 |

(3) COMPARE LEFT END AND RIGHT END    33

| ECCG USED PAGE COUNT | | |
|---|---|---|
| ECCG#2 | ECCG#3 | ECCG#1 |
| 3 | 3 | 1 |

(4) MIGRATE — MIGRATE ONE PAGE    33

| ECCG USED PAGE COUNT | | |
|---|---|---|
| ECCG#2 | ECCG#3 | ECCG#1 |
| 2 | 3 | 2 |

(5) REPEAT (2) TO (4)    33

| ECCG USED PAGE COUNT | | |
|---|---|---|
| ECCG#3 | ECCG#2 | ECCG#1 |
| 3 | 2 | 2 |

REPEAT UNTIL LEFT END (MAXIMUM) = RIGHT END (MINIMUM) + 1

| ECCG ID | START PAGE ID | END PAGE ID | TOTAL PAGE COUNT | USED PAGE COUNT | HDD TYPE |
|---|---|---|---|---|---|
| 1 | 0 | 5 | 6 | 5 | A |
| 2 | 6 | 9 | 4 | 1 | A |
| 3 | 10 | 14 | 5 | 2 | A |
| 4 | 15 | 17 | 3 | 0 | B |

(3)    (2)

24

| PAGE ID | ECCG VOL ID | ECCG INTERNAL PAGE ID | ALLOCATION DESTINATION VIRTUAL VOL ID | ALLOCATION DESTINATION PAGE ID | LAST ACCESS TIME |
|---|---|---|---|---|---|
| 0 | 1 | 0 | 100 | 0 | 11111111 |
| 1 | 1 | 1 | 100 | 1 | 22222222 |
| 2 | 1 | 2 | 100 | 4 | 88888888 |
| 3 | 1 | 3 | 101 | 0 | 77777777 |
| 4 | 1 | 4 | 100 | 5 | 33333333 |
| 5 | 1 | 5 | FFFF | FFFF | FFFF |
| 6 | 2 | 0 | 100 | 3 | 44444444 |
| 7 | 2 | 1 | FFFF | FFFF | FFFF |
| 8 | 2 | 2 | FFFF | FFFF | FFFF |
| 9 | 2 | 3 | FFFF | FFFF | FFFF |
| 10 | 3 | 0 | 101 | 3 | 66666666 |
| 11 | 3 | 1 | 101 | 1 | 55555555 |
| 12 | 3 | 2 | FFFF | FFFF | FFFF |
| 13 | 3 | 3 | FFFF | FFFF | FFFF |
| 14 | 3 | 4 | FFFF | FFFF | FFFF |
| 15 | 4 | 0 | FFFF | FFFF | FFFF |
| 16 | 4 | 1 | FFFF | FFFF | FFFF |
| 17 | 4 | 2 | FFFF | FFFF | FFFF |

(1)   (4)

24

| PAGE ID | ECCG VOL ID | ECCG INTERNAL PAGE ID | ALLOCATION DESTINATION VIRTUAL VOL ID | ALLOCATION DESTINATION PAGE ID | LAST ACCESS TIME |
|---|---|---|---|---|---|
| 0 | 1 | 0 | FFFF | FFFF | FFFF |
| 1 | 1 | 1 | FFFF | FFFF | FFFF |
| 2 | 1 | 2 | 100 | 4 | 88888888 |
| 3 | 1 | 3 | 101 | 0 | 77777777 |
| 4 | 1 | 4 | FFFF | FFFF | FFFF |
| 5 | 1 | 5 | FFFF | FFFF | FFFF |
| 6 | 2 | 0 | 100 | 3 | 44444444 |
| 7 | 2 | 1 | FFFF | FFFF | FFFF |
| 8 | 2 | 2 | FFFF | FFFF | FFFF |
| 9 | 2 | 3 | FFFF | FFFF | FFFF |
| 10 | 3 | 0 | 101 | 3 | 66666666 |
| 11 | 3 | 1 | 101 | 1 | 55555555 |
| 12 | 3 | 2 | FFFF | FFFF | FFFF |
| 13 | 3 | 3 | FFFF | FFFF | FFFF |
| 14 | 3 | 4 | FFFF | FFFF | FFFF |
| 15 | 4 | 0 | 100 | 0 | 11111111 |
| 16 | 4 | 1 | 100 | 1 | 22222222 |
| 17 | 4 | 2 | 100 | 5 | 33333333 |

FIG.25

VIRTUAL VOL CONFIGURATION INFORMATION TABLE (51)

| INDEX | VIRTUAL VOL ID | VIRTUAL VOL SIZE | ALLOCATED PAGE COUNT | PORT PAGE USED COUNT | | |
|---|---|---|---|---|---|---|
| | | | | PORT #1 | PORT #2 | PORT #3 |
| 0 | 100 | 6 | 5 | 4 | 1 | 0 |
| 1 | 101 | 4 | 3 | 1 | 0 | 2 |

VIRTUAL VOL ADDRESS INFORMATION TABLE (52)

| VOL# | VIRTUAL VOLUME INTERNAL PAGE ID | PORT ID | PORT MANAGEMENT PAGE ID |
|---|---|---|---|
| 100 | 0 | 1 | 0 |
| 100 | 1 | 1 | 1 |
| 100 | 2 | FFFF | FFFF |
| 100 | 3 | 2 | 0 |
| 100 | 4 | 1 | 2 |
| 100 | 5 | 1 | 4 |
| 101 | 0 | 1 | 3 |
| 101 | 1 | 3 | 1 |
| 101 | 2 | FFFF | FFFF |
| 101 | 3 | 3 | 0 |

PORT CONFIGURATION INFORMATION TABLE 53

| PORT ID | START PAGE ID | END PAGE ID | TOTAL PAGE COUNT | USED PAGE COUNT |
|---|---|---|---|---|
| 1 | 0 | 5 | 6 | 5 |
| 2 | 6 | 9 | 4 | 1 |
| 3 | 10 | 14 | 5 | 2 |

PORT MANAGEMENT PAGE CONFIGURATION INFORMATION TABLE (54)

| PAGE ID | PORT ID | PORT MANAGEMENT PAGE ID | ALLOCATION DESTINATION VIRTUAL VOLUME ID | ALLOCATION DESTINATION PAGE ID | LAST ACCESS TIME |
|---|---|---|---|---|---|
| 0 | 1 | 0 | 100 | 0 | 11111111 |
| 1 | 1 | 1 | 100 | 1 | 22222222 |
| 2 | 1 | 2 | 100 | 4 | 88888888 |
| 3 | 1 | 3 | 101 | 0 | 77777777 |
| 4 | 1 | 4 | 100 | 5 | 33333333 |
| 5 | 1 | 5 | FFFF | FFFF | FFFF |
| 6 | 2 | 0 | 100 | 3 | 44444444 |
| 7 | 2 | 1 | FFFF | FFFF | FFFF |
| 8 | 2 | 2 | FFFF | FFFF | FFFF |
| 9 | 2 | 3 | FFFF | FFFF | FFFF |
| 10 | 3 | 0 | 101 | 3 | 66666666 |
| 11 | 3 | 1 | 101 | 1 | 55555555 |
| 12 | 3 | 2 | FFFF | FFFF | FFFF |
| 13 | 3 | 3 | FFFF | FFFF | FFFF |
| 14 | 3 | 4 | FFFF | FFFF | FFFF |
| 54A | 54B | 54C | 54D | 54E | 54F |

FIG.29

ACCESS LOG INFORMATION TABLE 55

| ACCESS TIME | PORT ID | PORT MANAGEMENT PAGE ID |
|---|---|---|
| 11111111 | 1 | 0 |
| 22222222 | 1 | 1 |
| 33333333 | 1 | 4 |
| 44444444 | 2 | 0 |
| 55555555 | 3 | 1 |
| 66666666 | 3 | 0 |
| 77777777 | 1 | 3 |
| 88888888 | 1 | 2 |

55A  55B  55C

REPEAT UNTIL LEFT END (MAXIMUM) = RIGHT END (MINIMUM) + 1

STORAGE APPARATUS AND METHOD FOR ARRANGING STORAGE AREAS AND MANAGING ERROR CORRECTING CODE (ECC) GROUPS

CROSS REFERENCES

This application relates to and claims priority from Japanese Patent Application No. 2007-070826, filed on Mar. 19, 2007, the entire disclosure of which is incorporated herein by reference.

BACKGROUND

The present invention relates to a storage apparatus and a storage area arrangement method, and, for example, can be suitably applied to a storage apparatus that provides a storage area, which is capable of dynamically enhancing its capacity, to a host system.

Conventionally, in a storage system storing data using a storage apparatus, there is a method of managing a plurality of hard disks according to the RAID (Redundant Array of Independent/Inexpensive Disks) system. In addition, at least one or more logical volumes (hereinafter referred to as the "logical volumes") are formed on a physical storage area provided by the plurality of hard disks.

Further, in recent years, proposed is storage area dynamic allocation technology of providing a virtual volume (this is hereinafter referred to as the "virtual volume") to a host system based on a plurality of logical volumes and dynamically allocating the storage area of a logical volume to the virtual volume according to a request from the host system without creating fixed-capacity logical volumes from the storage area of the hard disks (for instance, refer to Japanese Patent Application No. 2003-015915; "Patent Document 1"). According to this storage area dynamic allocation technology, it is possible to dynamically enhance the virtual volume.

Nevertheless, when operating this storage area dynamic allocation technology on a long-term basis, there are cases where the allocated storage area in the logical volume being used by the virtual volume becomes biased. Consequently, access will be concentrated on a specific logical volume, and there is a risk that the overall response performance to requests from the host system will deteriorate.

SUMMARY

The present invention was made in view of the foregoing points. Thus, an object of the present invention is to propose a storage apparatus and a storage area arrangement method capable of preventing performance degradation.

In order to achieve the foregoing object, the present invention provides a storage apparatus for providing a dynamically expandable virtual volume to a host system to access the virtual volume. This storage apparatus comprises an allocation unit for configuring a group with a plurality of disks for providing a storage area to be allocated to the virtual volume, and allocating the storage area respectively from a plurality of the groups to the virtual volume; and a storage area arrangement unit for rearranging the storage area in each of the groups being used by the virtual volume to become optimal among each of the groups based on external operation.

Accordingly, it is possible to effectively prevent deterioration in the response performance to the host system caused by an allocated page in each group being used by the virtual volume becoming biased, and increased access to a specific group.

The present invention further provides a storage area arrangement method of a storage apparatus that provides a dynamically expandable virtual volume to a host system to access the virtual volume. This storage area arrangement method comprises a first step of configuring a group with a plurality of disks for providing a storage area to be allocated to the virtual volume, and allocating the storage area respectively from a plurality of the groups to the virtual volume; and a second step of rearranging the storage area in each of the groups being used by the virtual volume to become optimal among each of the groups based on external operation.

Accordingly, it is possible to effectively prevent deterioration in the response performance to the host system caused by an allocated page in each group being used by the virtual volume becoming biased, and increased access to a specific group.

According to the present invention, as a result of configuring a group with a plurality of disks for providing a storage area to be allocated to the virtual volume, and allocating the storage area respectively from a plurality of the groups to the virtual volume, and rearranging the storage area in each of the groups being used by the virtual volume to become optimal among each of the groups based on external operation, it is possible to effectively prevent deterioration in the response performance to the host system caused by an allocated page in each group being used by the virtual volume becoming biased, and increased access to a specific group, and thereby prevent performance degradation.

DESCRIPTION OF DRAWINGS

FIG. 4 is a conceptual diagram explaining a virtual VOL configuration information table;

FIG. 5 is a conceptual diagram explaining a virtual VOL address configuration information table;

FIG. 6 is a conceptual diagram explaining an ECCG configuration information table;

FIG. 7 is a conceptual diagram explaining an ECCG page configuration information table;

FIG. 8 is a conceptual diagram explaining an access log information table;

FIG. 14 is a conceptual diagram explaining the predetermined time access page equal arrangement processing routine;

FIG. 17 is a conceptual diagram explaining the empty page equal arrangement processing routine;

FIG. 21 is a conceptual diagram explaining the low-performance disk page arrangement processing routine;

FIG. 25 is a conceptual diagram explaining a virtual VOL configuration information table;

FIG. 26 is a conceptual diagram explaining the virtual VOL address configuration information table;

FIG. 27 is a conceptual diagram explaining a port configuration information table;

FIG. 28 is a conceptual diagram explaining a port management page configuration information table;

FIG. 29 is a conceptual diagram explaining an access log information table;

DETAILED DESCRIPTION

An embodiment of the present invention is now explained in detail with reference to the attached drawings.

(1) First Embodiment

Figure 1:
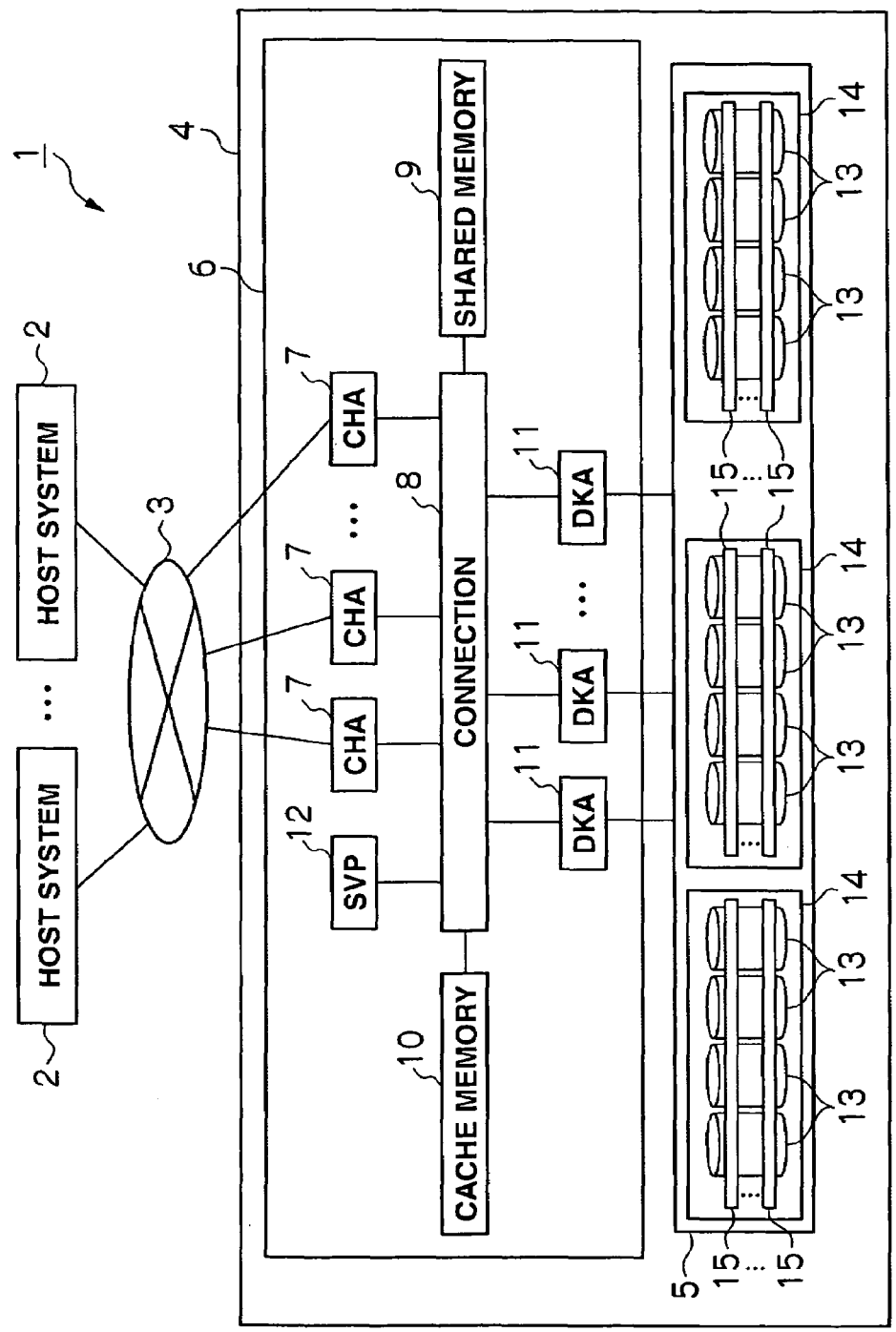
FIG. 1 is a block diagram showing a schematic configuration of a storage system according to an embodiment of the present invention.

FIG. 1 shows a storage system 1 according to the first embodiment. The storage system 1 is configured by a host system 2 being connected to a storage apparatus 4 via a network 3.

The host system 2 is a computer device comprising information processing resources such as a CPU (Central Processing Unit) and a memory, and, for instance, is configured from a personal computer, a workstation, a mainframe or the like.

Further, the host system 2 comprises an information input device (not shown) such as a keyboard, a switch, a pointing device or a microphone, and an information output device (not shown) such as a monitor display or a speaker.

The network 3, for example, is configured from a SAN (Storage Area Network), a LAN (Local Area Network), Internet, a public line or a dedicated line. Communication between the host system 2 and the storage apparatus 4 via the network 3 is conducted, for instance, according to a fibre channel protocol when the network 3 is a SAN, and according to a TCP/IP (Transmission Control Protocol/Internet Protocol) protocol when the network 3 is a LAN.

The storage apparatus 4 comprises a disk unit 5 configured from a plurality of hard disks (HDD) 13, and a controller 6 for managing the plurality of hard disks 13 based on a RAID system.

The hard disks 13, for example, are configured from expensive disks having high access performance such as SCSI (Small Computer System Interface) disks, or inexpensive disks having low access performance such as SATA (Serial AT Attachment) disks or optical disks.

The controller 6 comprises a plurality of channel adapters (CHA) 7, a connection 8, a shared memory 9, a cache memory 10, a plurality of disk adapters (DKA) 11, and a service processor 12.

Each channel adapter 7 is configured as a microcomputer system comprising a microprocessor (not shown), a memory (not shown), a communication interface and the like, and comprises a port (not shown) for connecting to the network 3. Each channel adapter 7 interprets various commands sent from the host system 2, and executes necessary processing. The port of each channel adapter 7 is allocated with a network address (i.e., IP address or WWN) for identifying the respective ports, and each channel adapter 7 is thereby able to individually function as a NAS (Network Attached Storage).

The connection 8 is connected, in addition to the foregoing channel adapters 7, to the shared memory 9, the cache memory 10 and the disk adapters 11. The sending and receiving of data and commands among the channel adapters 7, the shared memory 9, the cache memory 10 and the disk adapters 11 are conducted via the connection 8. The connection 8, for instance, is configured from a switch such as an ultrafast crossbar switch for transferring data by high-speed switching, a bus, or the like.

The shared memory 9 is a storage memory to be shared by the channel adapters 7 and the disk adapters 11. The shared memory 9 is primarily used for storing system configuration information and various control programs read from the system volume when the storage apparatus 4 is turned on, and commands from the host system 2. The various types of configuration information stored in the shared memory 9 will be described later.

The cache memory 10 is also a storage memory to be shared by the channel adapters 7 and the disk adapters 11. The cache memory 10 is primarily used for temporarily storing user data to be input to and output from the storage apparatus 4.

Each disk adapter 11 is configured as a microcomputer system comprising a microprocessor (not shown), a memory (not shown) and the like, and functions as an interface for performing protocol control during the communication with the disk unit 5. These disk adapters 11, for instance, are connected to the corresponding disk unit 5 via a fibre channel cable, and send and receive data to and from the disk unit 5 according to a fibre channel protocol.

The service processor 12 is a computer device to be operated for the maintenance or management of the storage apparatus 4, and, for example, is configured from a laptop personal computer. The service processor 12 is connected to the host system 2 via the network 3, and is able to receive data or commands from the host system 2. The service processor 12 is able to display the completion report of various execution processing in the storage apparatus 4 on a display screen (not shown).

Further, with the storage system 1 according to the first embodiment, among the plurality of hard disks 13, one ECC (Error Correcting Code) group (ECCG) 14 is configured for each set of four hard disks 13. One or more logical volumes 15 are defined on the storage area provided by one ECC group 14. Incidentally, an ECC group and a RAID group in the first embodiment are synonymous.

Among the respective logical volumes 15, a unique identifier (LUN: Logical Unit Number) is allocated to the logical volume 15 designated by the user. In the case of the first embodiment, the I/O of data is conducted by combining this identifier and a unique block number (LBA: Logical Block Address) allocated to the respective blocks to be the address, and designating such address.

Figure 2:
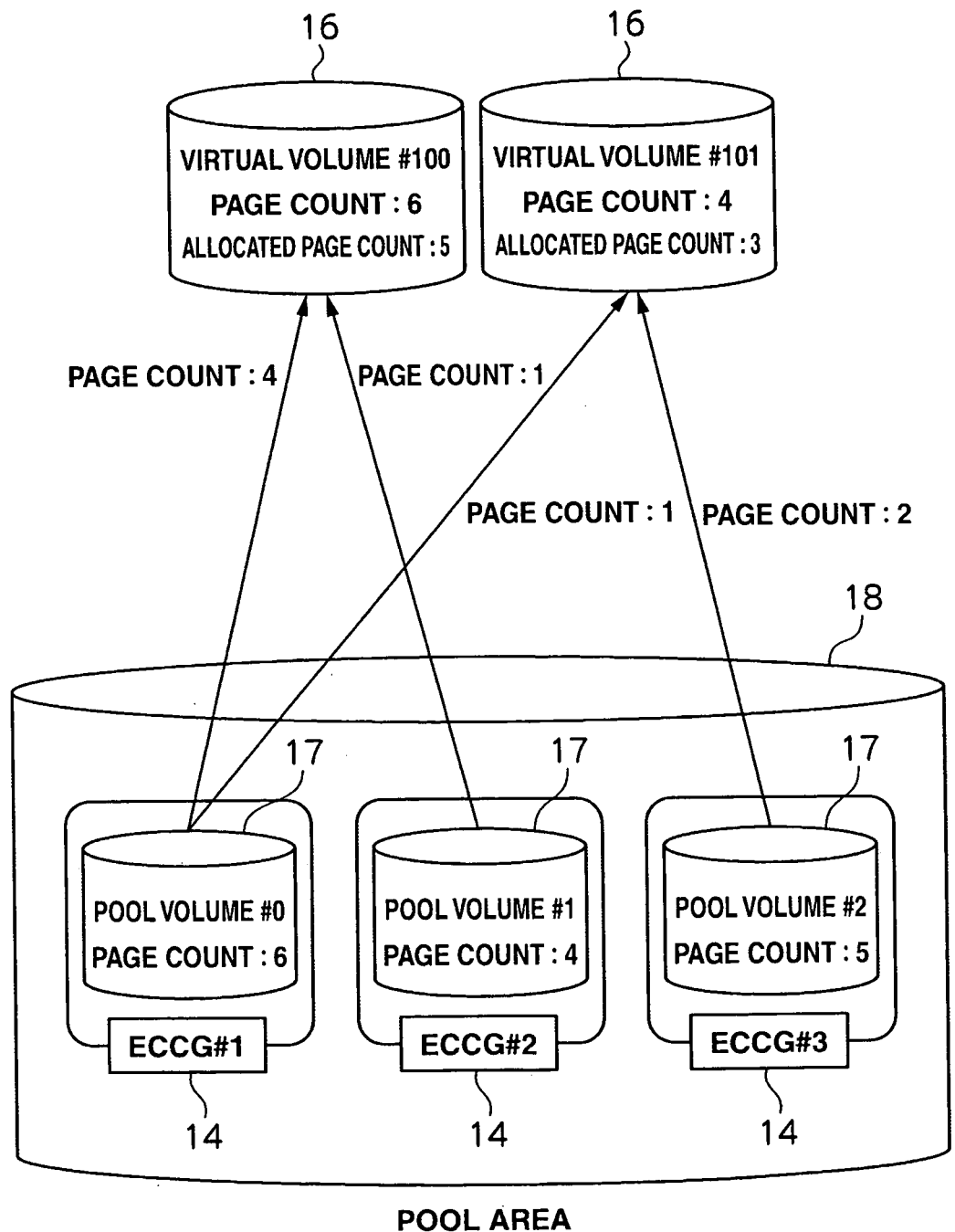
FIG. 2 is a conceptual diagram showing a logical configuration of a plurality of hard disks.

FIG. 2 is a conceptual diagram showing the logical configuration of the plurality of hard disks 13 in the storage system 1.

Here, as attributes of the logical volume 15, they can be broadly classified as a virtual volume (virtual VOL) 16, which is a logical volume 15 to be accessed by the host system 2, and a pool volume (pool VOL) 17, which is a logical volume 15 of a real volume to be used in the mapping with the virtual volume 16. A pool area 18 is formed from a plurality of pool volumes 17.

The virtual volume 16 is provided with a storage area by the storage area of the hard disk 13 in the pool volume 17 of the pool area 18 being dynamically allocated thereto.

The smallest storage area (virtual storage area) referred to as a page of the virtual volume 16 is allocated with the smallest storage area (real storage area) referred to as a page in the pool volume 17 of the ECC group 14.

Incidentally, in first embodiment, although one ECC group 14 is configured from one pool volume 17, the present invention is not limited thereto, and one ECC group 14 may be configured from a plurality of pool volumes 17.

For example, in the case of the first embodiment, an ECC group 14 (ECCG #1) is configured from a pool volume 17 (pool VOL #0), an ECC group 14 (ECCG #2) is configured from a pool volume 17 (pool VOL #1), and an ECC group 14 (ECCG #3) is configured from a pool volume 17 (pool VOL #2). Further, a pool area 18 is configured from these three ECC groups 14 (ECCG #1, ECCG #2, ECCG #3). Moreover, two virtual volumes 16 (virtual VOL 100 and virtual VOL 101) are also configured.

Incidentally, in first embodiment, although one ECC group 14 is configured from one pool volume 17, the present invention is not limited thereto, and one ECC group 14 may be configured from a plurality of pool volumes 17.

Figure 3:
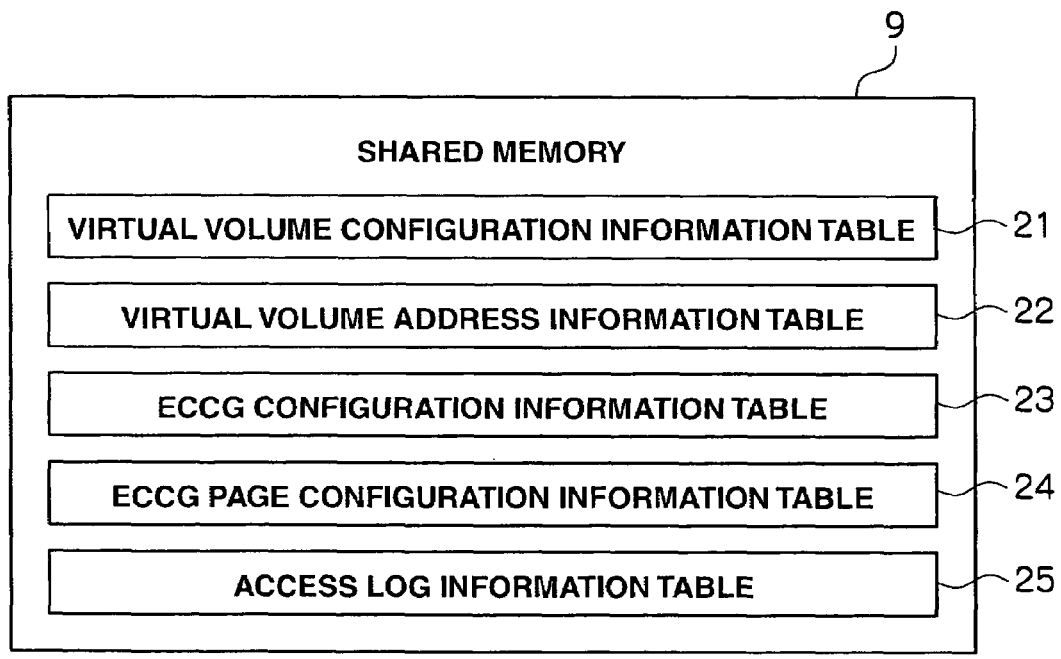
FIG. 3 is a conceptual diagram explaining the various tables stored in a shared memory.

FIG. 3 shows an example of the various tables stored in the shared memory 9. The shared memory 9 is configured from a virtual VOL configuration information table 21 for managing the configuration information of the virtual volume 16, a virtual VOL address information table 22 for managing the address information of the virtual volume 16, an ECCG configuration information table 23 for managing the configuration information of the ECCG in the pool area 18, an ECCG page configuration information table 24 for managing the configuration information of pages in the ECC group 14, and an access log information table 25 for managing the access log of pages in the ECC group 14.

FIG. 4 shows an example of the configuration of the virtual VOL configuration information table 21. The virtual VOL configuration information table 21 is configured from an index column 21A for managing the index number in the virtual VOL configuration information table 21, a virtual VOL ID column 21B for managing the virtual VOL ID, which is an identifier for uniquely identifying the virtual volume 16, a virtual VOL size column 21C for managing the size of the virtual storage area of the virtual volume 16 based on the number of pages, an allocated page count column 21D for managing the number of pages allocated in the virtual volume 16, and an ECCG used page count column 21E for managing the number of pages of the ECC group 14 being used by the virtual volume 16 based on each ECCG ID, which is an identifier for uniquely identifying the ECC group 14.

For example, in the case of the first embodiment, the virtual VOL size (page count) is "6" pages for the virtual volume 16 (virtual VOL #100) with a virtual VOL ID of "100," and the allocated page count among the virtual VOL size is "5" pages. Further, regarding the virtual volume 16 (virtual VOL #100) with a virtual VOL ID of "100," "4" pages are allocated as the page count from the ECC group 14 (ECCG #0) with an ECCG ID of "0" among the allocated page count, and "1" page is allocated as the page count from the ECC group 14 (ECCG #1) with an ECCG ID of "1" (FIG. 2).

Further, for instance, in the case of the first embodiment, the virtual VOL size (page count) is "4" pages for the virtual volume 16 (virtual VOL #101) with a virtual VOL ID of "101," and the allocated page count among the virtual VOL size is "3" pages. Moreover, regarding the virtual volume 16 (virtual VOL #101) with a virtual VOL ID of "101," "1" page is allocated as the page count from the ECC group 14 (ECCG #1) with an ECCG ID of "1" among the allocated page count, and "2" pages are allocated as the page count from the ECC group 14 (ECCG #2) with an ECCG ID of "2" (FIG. 2).

FIG. 5 shows an example of the configuration of the virtual VOL address configuration information table 22. The virtual VOL address configuration information table 22 is configured from a virtual VOL ID column 22A, a virtual VOL internal page ID column 22B for managing the virtual VOL internal page ID, which is an identifier for uniquely identifying the pages in the virtual volume 16, an ECCG ID column 22C for managing the ECCG ID, and an ECCG internal page ID column 22D for managing the ECCG internal page ID, which is an identifier for uniquely identifying the pages in the ECC group 14.

For example, in the case of the first embodiment, the page of ECCG internal page ID "0" in the ECC group 14 (ECCG #1) with an ECCG ID of "1" is allocated to the page of virtual VOL page ID "0" in the virtual volume 16 (virtual VOL #100) with a virtual VOL ID of "100."

Incidentally, when an ECCG internal page of the ECC group 14 is not allocated to the virtual VOL internal page of the virtual volume 16, "FFFF" is stored and managed in the ECCG ID column 22C and the ECCG internal page ID column 22D. For example, in the case of the first embodiment, an ECCG internal page of the ECC group 14 is not allocated to the virtual VOL page ID "2" of the virtual volume 16 (virtual VOL #100) with a virtual VOL ID of "100."

FIG. 6 shows an example of the configuration of the ECCG configuration information table 23. The ECCG configuration information table 23 is configured from an ECCG ID column 23A, a start page column 23B for managing the start page of the corresponding ECC group 14 among the page IDs, which are identifiers for uniquely identifying the pages of the pool area 18, an end page column 23C for managing the end page of the corresponding ECC group 14 among the page IDs, a total page count column 23D for managing the total page count of the ECC group 14, a used page count 23E for managing the number of pages used in the virtual volume 16, and an HDD type column 23F for managing the type of hard disks 13 configuring the ECC group 14.

In the case of the first embodiment, the hard disks 13 of HDD type "A" are expensive disks with high access performance such as SCSI disks, and the hard disks 13 of HDD type "B" are inexpensive disks with low access performance such as SATA disks and optical disks.

For example, in the case of the first embodiment, regarding the ECC group 14 (ECCG #1) with an ECCG ID of "1," the page ID of the start page is "0," the page ID of the end page is "6," the total page count is "6," the used page count is "5," and the HDD type is "A."

FIG. 7 shows an example of the configuration of the ECCG page configuration information table 24. The ECCG page configuration information table 24 is configured from a page ID column 24A, an ECCG ID column 24B, an ECCG internal page ID column 24C, an allocation destination virtual VOL ID column 24D for managing the virtual VOL ID of the virtual volume 16 of the allocation destination to which the page is to be allocated, an allocation destination page ID column 24E for managing the page ID (virtual VOL internal page ID) of the allocation destination in the virtual volume 16 of the allocation destination, and a last access time column 24F for managing the last access time to which the page was last accessed.

For example, in the case of the first embodiment, a page with a page ID of "0" is a page with an ECCG internal page ID of "0" in the ECC group 14 with an ECCG ID of "1." Further, a page with a page ID of "0" is allocated to the virtual storage area with a virtual VOL internal page ID of "0" in the virtual volume 16 (virtual VOL #100) with an allocation destination virtual VOL ID of "100." Further, a page with a page ID of "0" shows that it was last accessed at time "11111111."

Incidentally, when a page corresponding to the page ID is not allocated to the virtual VOL internal page of the virtual volume 16, "FFFF" is stored and managed in the allocation destination virtual VOL ID column 24D, the allocation destination page ID column 24E, and the last access time column 24F. For example, in the case of the first embodiment, a page with a page ID of "5" is not allocated to the virtual VOL internal page of the virtual volume 16.

FIG. 8 shows an example of the configuration of the access log information table 25. The access log information table 25 is configured from an access time column 25A for managing the access time arranged in the accessed sequence, an ECCG ID column 25B, and an ECCG internal page ID column 25C.

For example, in the case of the first embodiment, the page of ECCG internal page ID "0" in the ECC group 14 with an ECCG ID of "1" was accessed at time "11111111."

Figure 9:
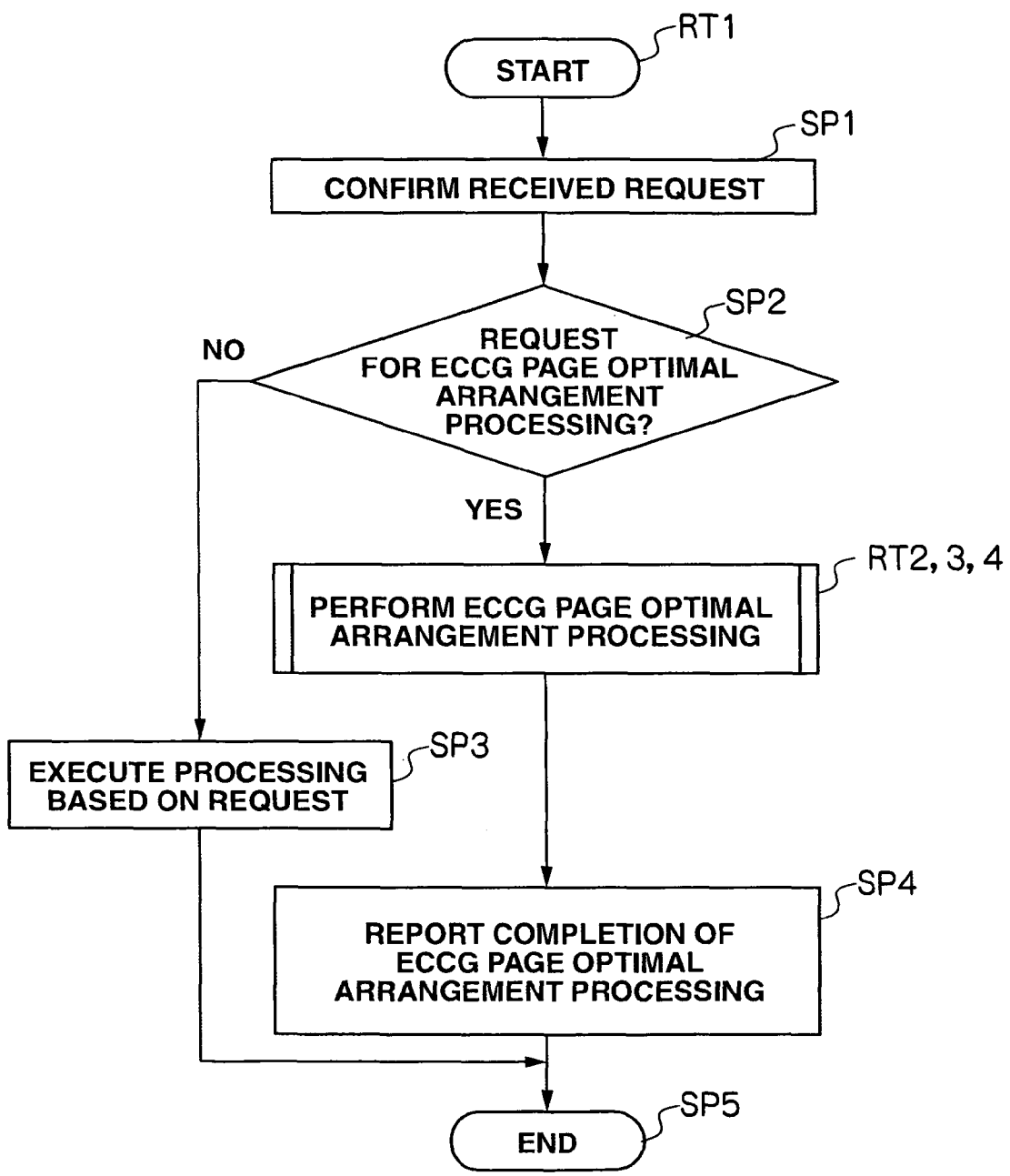
FIG. 9 is a flowchart showing a control processing routine.

FIG. 9 is an example of a flowchart showing the specific processing routine of the disk adapter 11 of the storage apparatus 4 concerning the control processing of the storage apparatus 4 in the storage system 1.

When the disk adapter 11 receives some kind of request sent from the host system 2 or the service processor 12 based on the user's operation of such host system 2 or service processor 12, it confirms the received request according to the control processing routine RT1 shown in FIG. 9 by executing a control program (not shown), which is stored in a memory (not shown) in the disk adapter 11, for performing the control processing of the disk adapter 11 based on the request (SP1).

Subsequently, the disk adapter 11 checks whether the request is an ECCG page optimal arrangement processing request for optimally arranging the pages in the ECC group 14 (SP2).

When the request is not an ECCG page optimal arrangement processing request (SP2: NO), the disk adapter 11 specifies the type of request that was sent, and executes processing based on such request (SP3), The disk adapter 11 thereafter ends the control processing routine RT1 shown in FIG. 9 (SP5).

Contrarily, when the request is an ECCG page optimal arrangement processing request (SP2: YES), the disk adapter 11 executes such ECCG page optimal arrangement processing (RT2, 3, 4).

Incidentally, in the case of the first embodiment, described as the ECCG page optimal arrangement processing are, for instance, ECCG page optimal arrangement processing (RT2) for equally rearranging the pages in each ECC group 14 being used by the virtual volume 16, ECCG page optimal arrangement processing (RT3) for equally rearranging the pages in the ECC group 14 that was accessed within a prescribed time, ECCG page optimal arrangement processing (RT4) for equally rearranging the empty pages in the ECC loop 14, and ECCG page optimal arrangement processing (RT6) for rearranging the pages in the ECC group 14 of low-performance disks (all described later). Nevertheless, the present invention is not limited thereto, and can be applied to various other types of ECCG page optimal arrangement processing for optimally arranging the pages in the ECC group 14.

Subsequently, the disk adapter 11 sends an ECCG page optimal arrangement processing completion notice to the host system 2 so as to report the completion of the ECCG page optimal arrangement processing to the user of the host system 2 (SP4).

Eventually, the disk adapter 11 thereafter ends the control processing routine RT1 shown in FIG. 9 (SP5).

Figure 10:
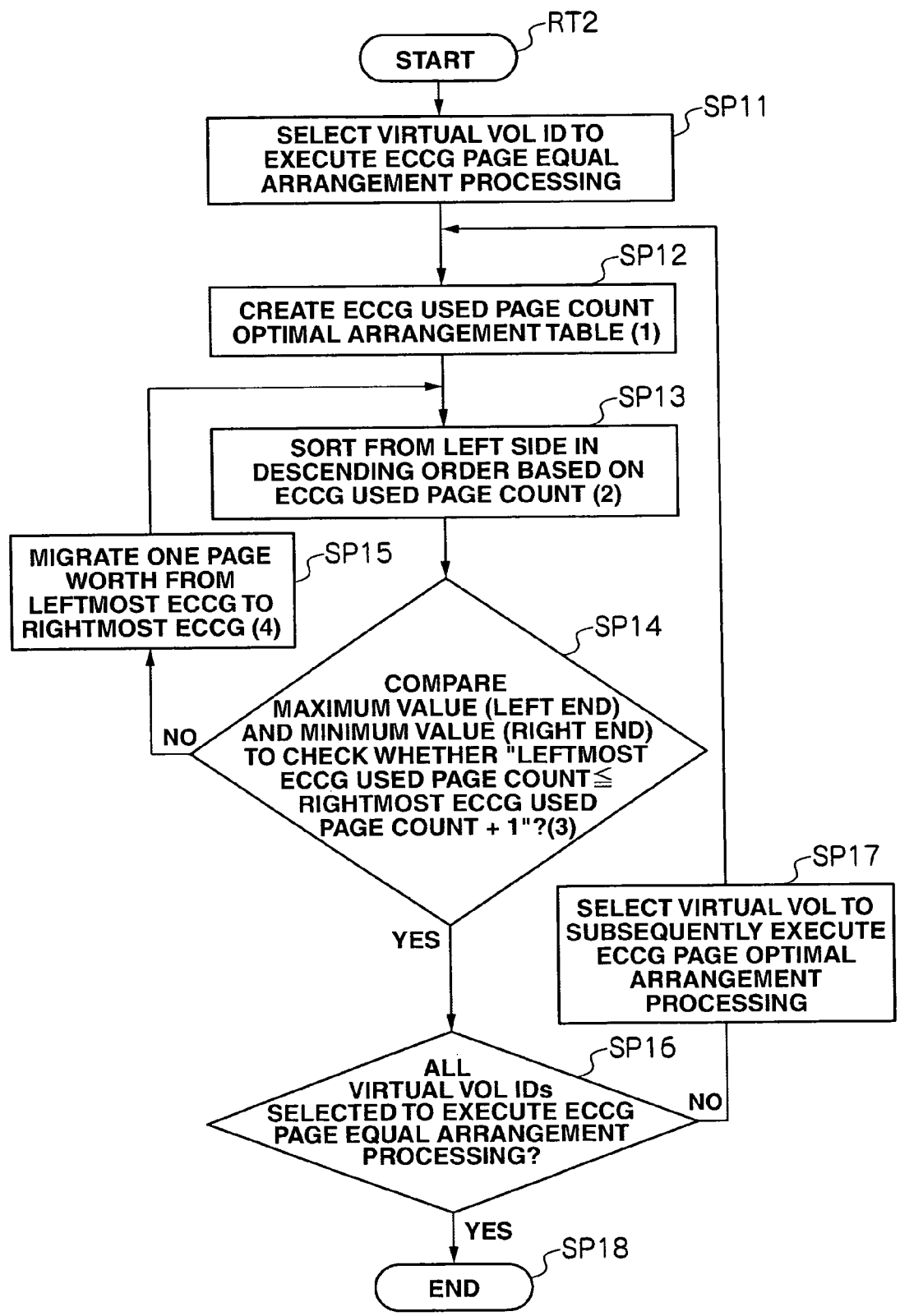
FIG. 10 is a flowchart showing an ECCG page equal arrangement processing routine.
Figure 11:
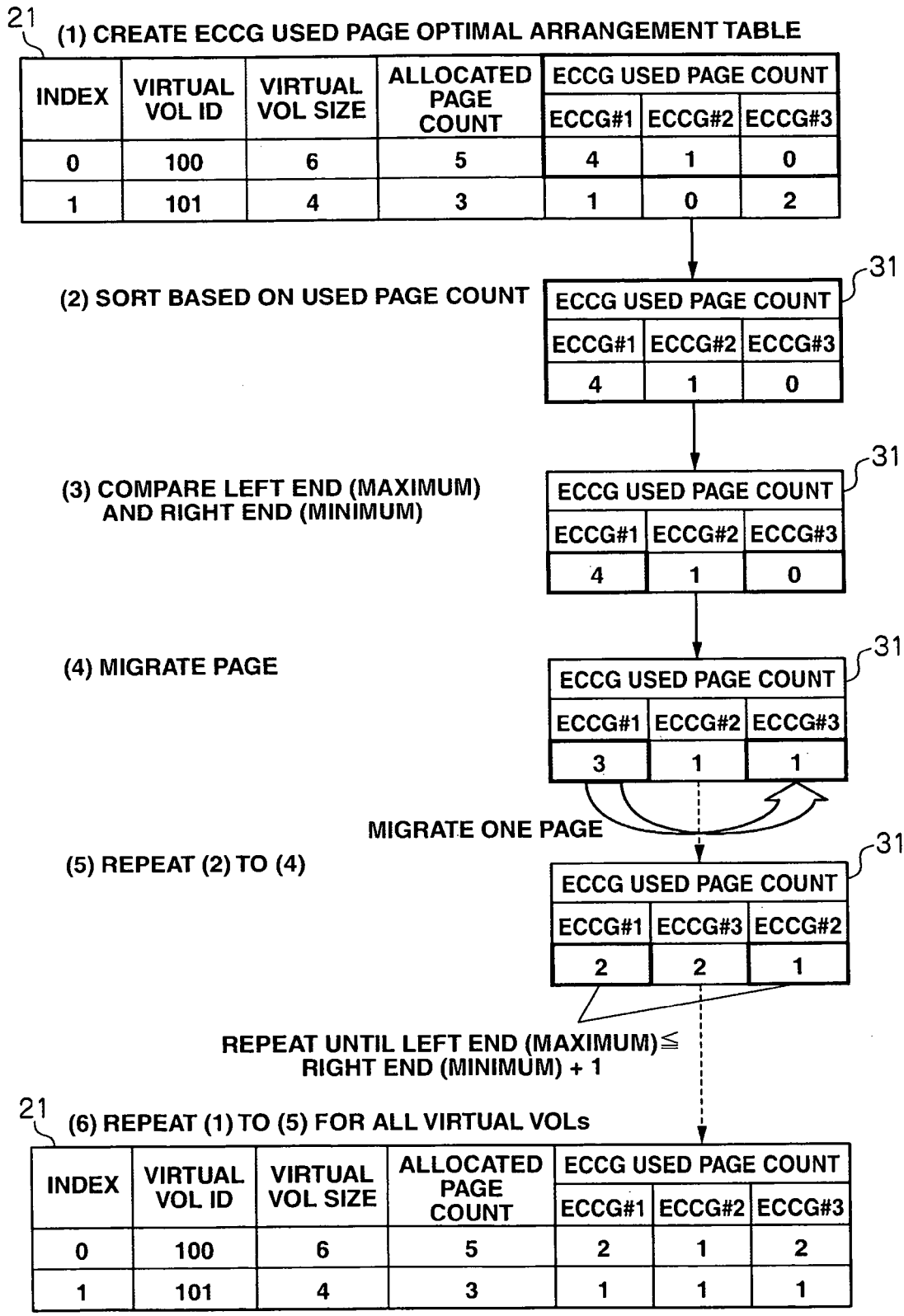
FIG. 11 is a conceptual diagram explaining the ECCG page equal arrangement processing routine.
Figure 12:
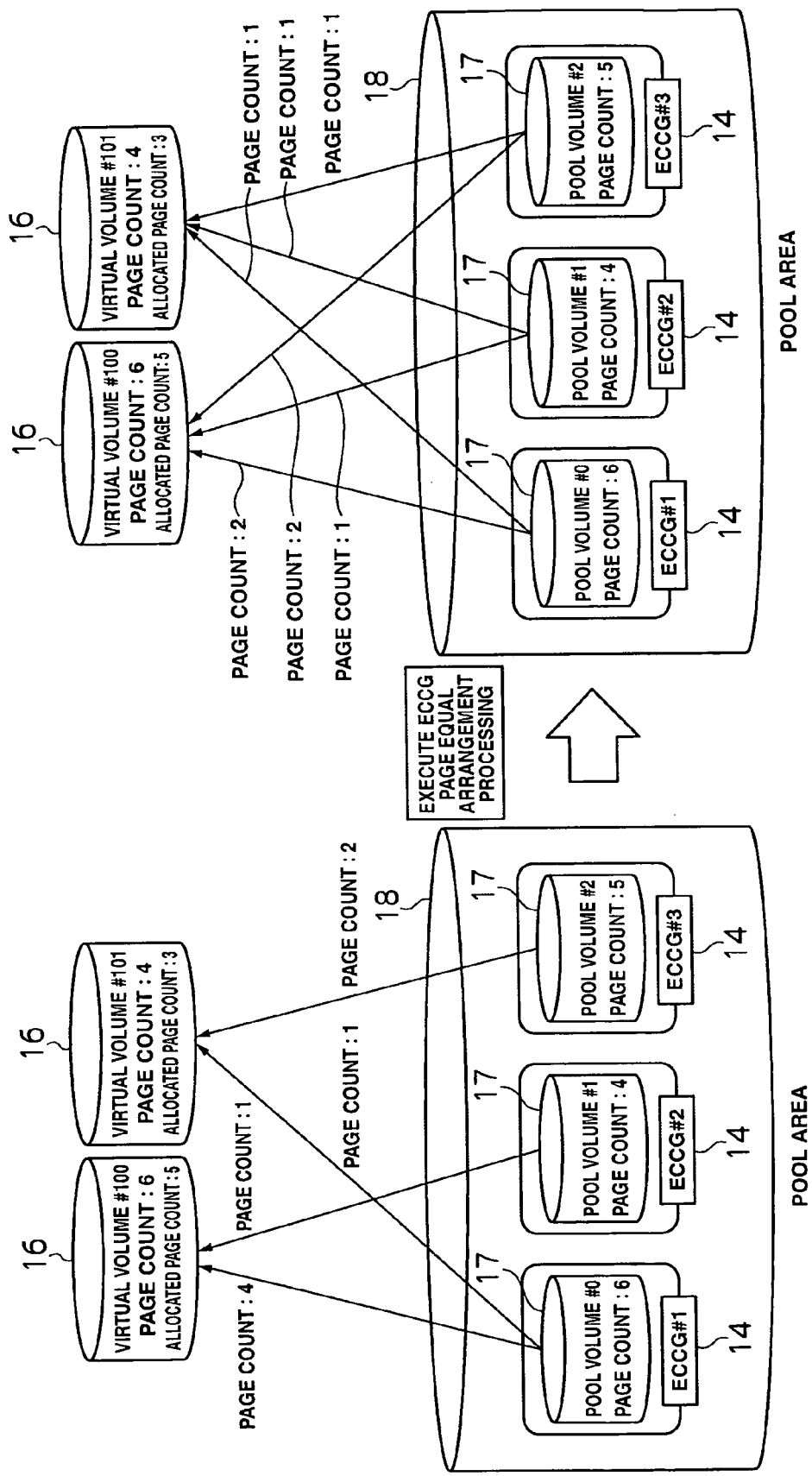
FIG. 12 is a conceptual diagram schematically showing the contents of ECCG page equal arrangement processing.

FIG. 10 is an example of a flowchart showing the specific processing routine of the disk adapter 11 of the storage apparatus 4 concerning the ECCG page optimal arrangement processing for equally rearranging the pages in each ECC group 14 being used by the virtual volume 16 of the storage apparatus 4 in the storage system 1. Further, FIG. 11 is a conceptual diagram specifically explaining the ECCG page optimal arrangement processing routine. Moreover, FIG. 12 is a conceptual diagram schematically showing the contents of the ECCG page optimal arrangement processing.

When the disk adapter 11 receives an ECCG page optimal arrangement processing request for equally rearranging the pages in each ECC group 14 being used by the virtual volume 16, by executing the ECCG page equal arrangement processing program as the control program, it selects the virtual VOL ID of the virtual volume 16 to execute the ECCG page equal arrangement processing from the virtual VOL ID column 21A of the virtual VOL configuration information table 21 by referring to the virtual VOL configuration information table 21 according to the ECCG page equal arrangement processing routine RT2 shown in FIG. 10 (SP11).

Subsequently, the disk adapter 11 extracts the ECCG used page count for each ECC group 14 of the selected virtual VOL ID, and creates an ECCG used page count optimal arrangement table 31 showing the relationship of the page count (ECCG used page count) in each ECC group 14 being used the virtual volume 16, and the ECCG ID of the ECC group 14 of that page (FIG. 11 (1)) (SP12).

The disk adapter 11 thereafter sorts the ECCG ID and its corresponding ECCG used page count in the ECCG used page count optimal arrangement table 31 in descending order based on the ECCG used page count (FIG. 11 (2)) (SP13). In other words, the disk adapter 11 switches the ECCG ID an its corresponding ECCG used page count so that the ECCG ID with a higher ECCG used page count will be located farther left in the ECCG used page optimal arrangement table 31.

Subsequently, the disk adapter 11 compares the ECCG used page count with the largest ECCG used page count (ECCG used page count is a maximum value) at the leftmost part of the ECCG used page count optimal arrangement table 31, and the ECCG used page count with the smallest ECCG used page count (ECCG used page count is a minimum value) at the rightmost part of the ECCG used page count optimal arrangement table 31, and then checks whether the leftmost ECCG used page count is a number that is equal to the rightmost ECCG used page count+1, or whether the leftmost ECCG used page count is a number that is smaller than the rightmost ECCG used page count+1 (FIG. 11 (3)) (SP14).

When the leftmost ECCG used page count is not a number that is equal to the rightmost ECCG used page count+1, and the leftmost ECCG used page count is not a number that is smaller than the rightmost ECCG used page count+1; that is, when the leftmost ECCG used page count is a number that is greater than the rightmost ECCG used page count+1 (SP14: NO), the disk adapter 11 migrates one page worth of the pages being used by the virtual volume 16 from the leftmost ECC group 14 to the rightmost ECC group 14 (SP15), thereafter once again returns to step SP13 for sorting the ECCG ID and its corresponding ECCG used page count in the ECCG used page count optimal arrangement table 31 in descending order based on the ECCG used page count (FIG. 11 (2)), and then repeats the same processing (FIG. 11 (5)) (SP13 to SP15).

Incidentally, when data is stored in the page of the migration source, the disk adapter 11 also migrates the page stored in the page of the migration source to the page of the migration destination.

Contrarily, when the leftmost ECCG used page count is a number that is equal to the rightmost ECCG used page count+1, or the leftmost ECCG used page count is a number that is smaller than the rightmost ECCG used page count+1 (SP14: YES), the disk adapter 11 checks whether the ECCG page optimal arrangement processing was performed by selecting the virtual VOL ID of all virtual volumes 16 from the virtual VOL ID column 21A of the virtual VOL configuration information table 21 (SP16).

When the ECCG page optimal arrangement processing was not performed by selecting the virtual VOL ID of all virtual volumes 16 from the virtual VOL ID column 21A of the virtual VOL configuration information table 21 (SP16: NO), the disk adapter 11 selects the virtual VOL ID of the virtual volume 16 to subsequently execute the ECCG page optimal arrangement processing from the virtual VOL ID column 21A of the virtual VOL configuration information table 21 by referring to the virtual VOL configuration information table 21 (SP17), thereafter once again returns to step SP12 for extracting the ECCG used page count for each ECC group 14 of the selected virtual VOL ID, and creating the ECCG used page count optimal arrangement table 31 (FIG. 11 (1)), and then repeats the same processing (FIG. 11 (6)) (SP12 to SP17).

Contrarily, when the ECCG page optimal arrangement processing was performed by selecting the virtual VOL ID of all virtual volumes 16 from the virtual VOL ID column 21A of the virtual VOL configuration information table 21 (SP16: YES), the disk adapter 11 thereafter ends the ECCG page equal arrangement processing routine RT2 shown in FIG. 10 (SP18).

For example, as shown in FIG. 12, prior to executing the ECCG page equal arrangement processing, regarding the virtual volume 16 (virtual VOL #100) with a virtual VOL ID of "100," the virtual VOL size (page count) is "6" pages, and the allocated page count among the virtual VOL size is "5" pages. Further, regarding the virtual volume 16 (virtual VOL #100) with a virtual VOL ID of "100," "4" pages are allocated as the page count from the ECC group 14 (ECCG #1) with an ECCG ID of "1" among the allocated page count, and "1" page is allocated as the page count from the ECC group 14 (ECCG #2) with an ECCG ID of "2."

As shown in FIG. 12, after executing the ECCG page equal arrangement processing, regarding the virtual volume 16 (virtual VOL #100) with a virtual VOL ID of "100," the pages in each ECC group 14 being used by the virtual volume 16 are equally rearranged in each ECC group 14, "2" pages as the page count are allocated from the ECC group 14 (ECCG #1) with an ECCG ID of "1," "1" page as the page count is allocated from the ECC group 14 (ECCG #2) with an ECCG ID of "2," and "2" pages as the page count are allocated from the ECC group 14 (ECCG #3) with an ECCG ID of "3" among the allocated page count.

Further, as shown in FIG. 12, prior to executing the ECCG page equal arrangement processing, regarding the virtual volume 16 (virtual VOL #101) with a virtual VOL ID of "101," the virtual VOL size (page count) is "4" pages, and the allocated page count among the virtual VOL size is "3" pages. Further, regarding the virtual volume 16 (virtual VOL #101) with a virtual VOL ID of "101," "1" page is allocated as the page count from the ECC group 14 (ECCG #1) with an ECCG ID of "1" among the allocated page count, and "2" pages are allocated as the page count from the ECC group 14 (ECCG #3) with an ECCG ID of "3."

Here, as shown in FIG. 12, after executing the ECCG page equal arrangement processing, regarding the virtual volume 16 (virtual VOL #101) with a virtual VOL ID of "101," the pages in each ECC group 14 being used by the virtual volume 16 are equally rearranged, "1" page as the page count is allocated from the ECC group 14 (ECCG #1) with an ECCG ID of "1," "1" page as the page count is allocated from the ECC group 14 (ECCG #2) with an ECCG ID of "2," and "1" page as the page count is allocated from the ECC group 14 (ECCG #3) with an ECCG ID of "3" among the allocated page count.

Like this, with the storage system 1, since the pages in each ECC group 14 being used by the virtual volume 16 are rearranged to become equal among the respective ECC groups 14, it is possible to effectively prevent deterioration in the response performance to the host system 2 caused by an allocated page in each ECC group 14 being used by the virtual volume 16 becoming biased.

Figure 13:
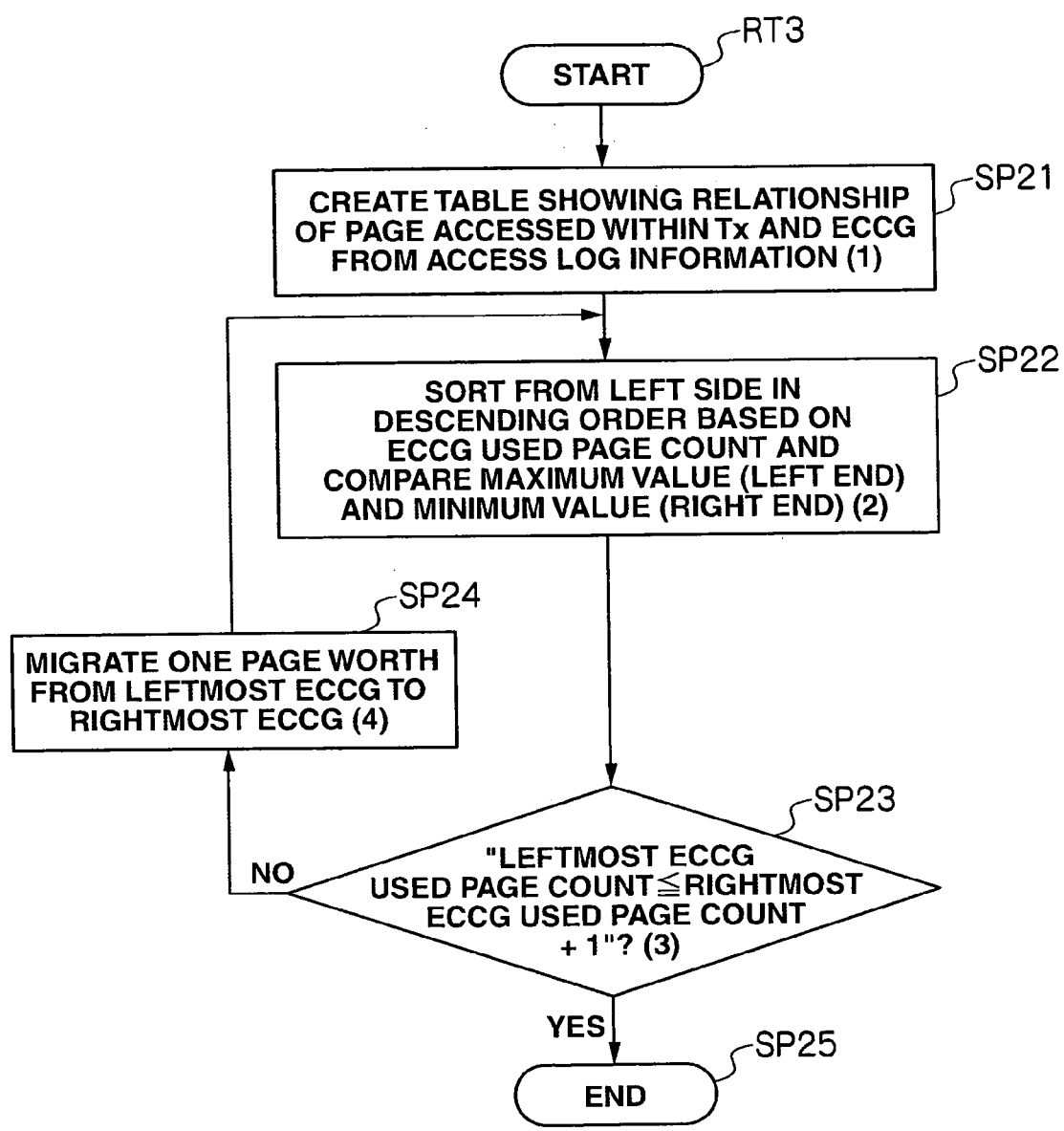
FIG. 13 is a flowchart showing a predetermined time access page equal arrangement processing routine.
Figure 15:
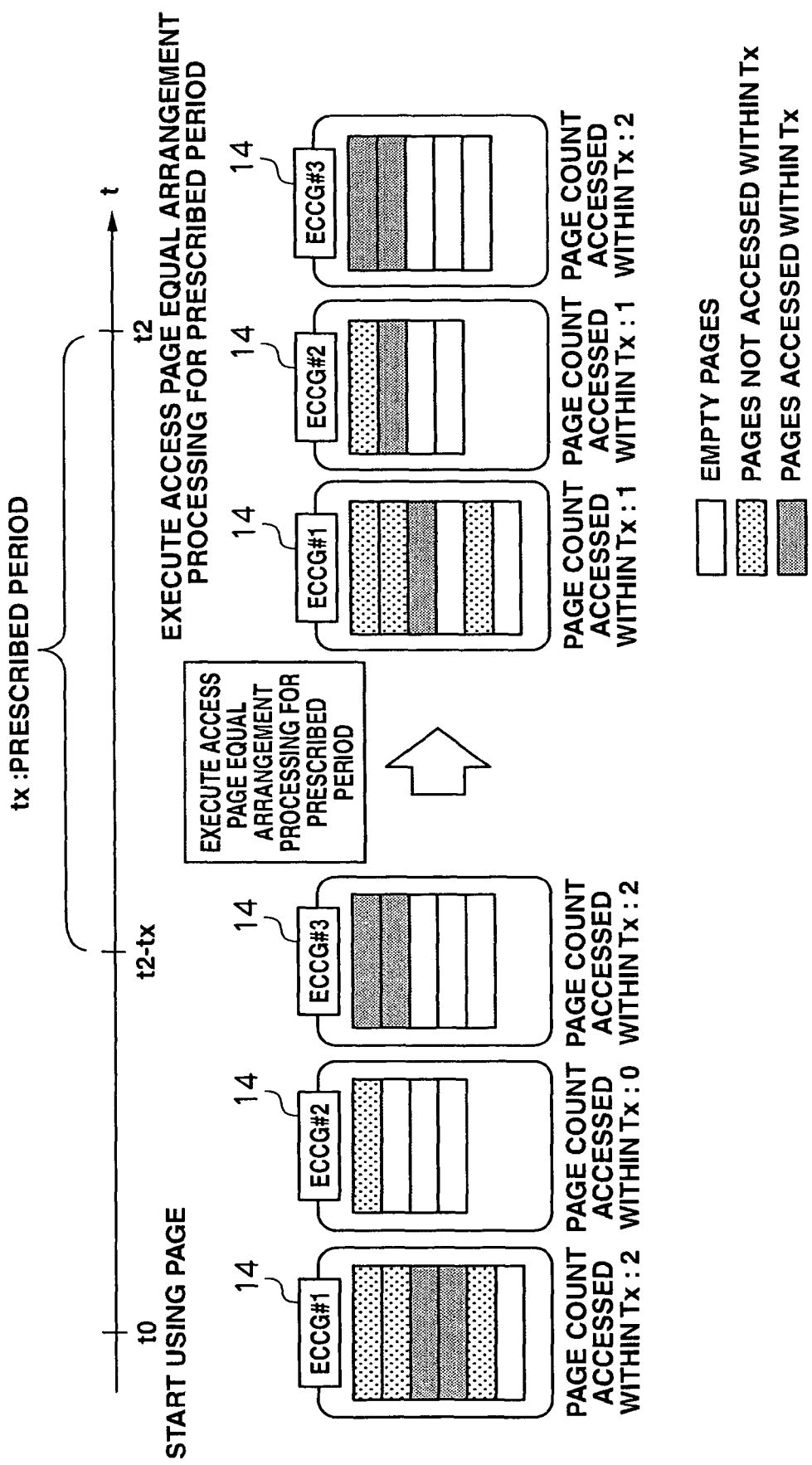
FIG. 15 is a conceptual diagram schematically showing the contents of predetermined time access page equal arrangement processing.

FIG. 13 is an example of a flowchart showing the specific processing routine of the disk adapter 11 of the storage apparatus 4 concerning the ECCG page optimal arrangement processing for equally rearranging the pages in the ECC group 14 that were accessed within a prescribed time of the storage apparatus 4 in the storage system 1. Further, FIG. 14 is a conceptual diagram specifically explaining the ECCG page optimal arrangement processing routine. Moreover, FIG. 15 is a conceptual diagram schematically showing the contents of the ECCG page optimal arrangement processing.

When the disk adapter 11 receives an ECCG page optimal arrangement processing request for equally rearranging the pages in the ECC group 14 that were accessed within a prescribed time, by executing the predetermined time access page equal arrangement processing program as the control program, it extracts the pages that were accessed within the time designated by the user of the host system 2 contained in the ECCG page optimal arrangement processing request, and creates an access page count optimal arrangement table 32 showing the relationship of the page count (ECCG used page count) in each ECC group 14 regarding the pages that were accessed within the time designated by the user of the host system 2, and the ECCG ID of the ECC group 14 of such pages by referring to the access log information table 25 according to the predetermined time access page equal arrangement processing routine RT3 shown in FIG. 11 (FIG. 14 (1)) (SP21).

For example, in the first embodiment, the disk adapter 11 extracts the pages that were accessed from time "Tx" up to the ECCG page optimal arrangement processing, and then creates the access page count optimal arrangement table 32 (FIG. 14 (1)).

The disk adapter 11 thereafter sorts the ECCG ID and its corresponding ECCG used page count in the access page count optimal arrangement table 32 in descending order based on the ECCG used page count (FIG. 14 (2)) (SP22).

Subsequently, the disk adapter 11 compares the leftmost ECCG used page count and the rightmost ECCG used page count, and checks whether the leftmost ECCG used page count is a number that is equal to the rightmost ECCG used page count+1, or whether the leftmost ECCG used page count is a number that is smaller than the rightmost ECCG used page count+1 (FIG. 14 (3)) (SP23).

When the leftmost ECCG used page count is not a number that is equal to the rightmost ECCG used page count+1, and the leftmost ECCG used page count is not a number that is smaller than the rightmost ECCG used page count+1; that is, when the leftmost ECCG used page count is a number that is greater than the rightmost ECCG used page count+1 (SP23: NO), the disk adapter 11 migrates one page worth of the pages being used by the virtual volume 16 from the leftmost ECC group 14 to the rightmost ECC group 14 (SP24), thereafter once again returns to step SP22 for sorting the ECCG ID and its corresponding ECCG used page count in the access page count optimal arrangement table 32 in descending order based on the ECCG used page count (FIG. 14 (2)), and then repeats the same processing (FIG. 14 (5)) (SP22 to SP24).

Contrarily, when the leftmost ECCG used page count is a number that is equal to the rightmost ECCG used page count+1, or the leftmost ECCG used page count is a number that is smaller than the rightmost ECCG used page count+1 (SP23: YES), the disk adapter 11 thereafter ends this predetermined time access page equal arrangement processing routine RT3 shown in FIG. 13 (SP25).

For example, as shown in FIG. 15, let it be assumed that the start of page use is "t0," the time that the predetermined time access page equal arrangement processing was executed is "t2," and the time designated by the user of the host system 2 included in the predetermined time access page equal arrangement processing request is "Tx." Here, prior to executing the predetermined time access page equal arrangement processing, the accessed page count from time "Tx" up to the predetermined time access page equal arrangement processing is "2" pages regarding the ECC group 14 (ECCG #1) with an ECCG ID of "1," the accessed page count from time "Tx" up to the predetermined time access page equal arrangement processing is "0" pages regarding the ECC group 14 (ECCG #2) with an ECCG ID of "2", and the accessed page count from time "Tx" up to the predetermined time access page equal arrangement processing is "2" pages regarding the ECC group 14 (ECCG #3) with an ECCG ID of "3".

Here, as shown in FIG. 15, after the execution of the predetermined time access page equal arrangement processing, the pages that were accessed from time "Tx" up to the predetermined time access page equal arrangement processing are equally arranged in each ECC group 14, and the accessed page count from time "Tx" up to the predetermined time access page equal arrangement processing is "1" page regarding the ECC group 14 (ECCG #1) with an ECCG ID of "1," the accessed page count from time "Tx" up to the predetermined time access page equal arrangement processing is "1" page regarding the ECC group 14 (ECCG #2) with an ECCG ID of "2", and the accessed page count from time "Tx" up to the predetermined time access page equal arrangement processing is "2" pages regarding the ECC group 14 (ECCG #3) with an ECCG ID of "3".

Like this, with the storage system 1, pages that were accessed within a prescribed time are equally rearranged among the respective ECC groups 14. Thus, for instance, since it is possible to equally rearrange the pages that were recently accessed, in particular, it is possible to effectively prevent the response performance to the host system 2 at the present moment from deteriorating.

Figure 16:
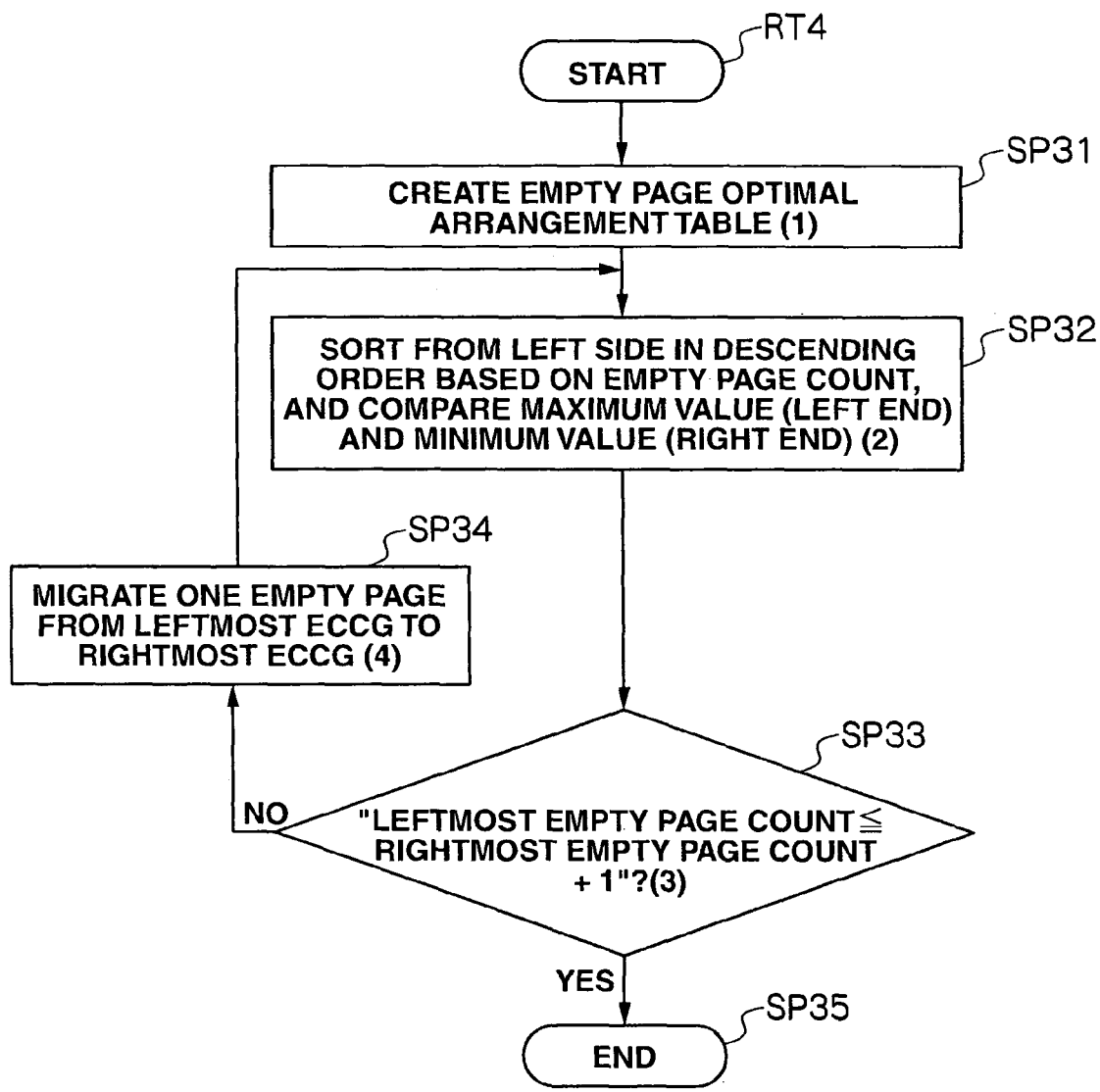
FIG. 16 is a flowchart showing an empty page equal arrangement processing routine.
Figure 18:
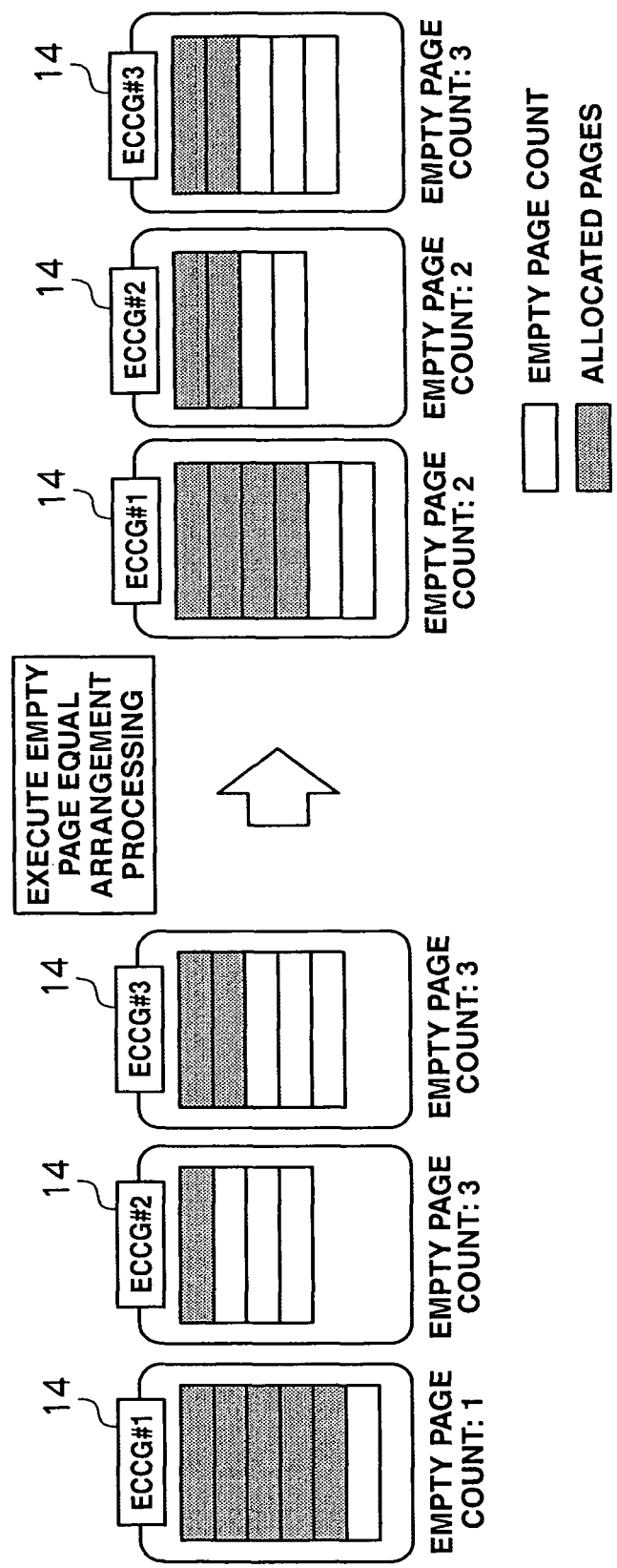
FIG. 18 is a conceptual diagram schematically showing the contents of empty page equal arrangement processing.

FIG. 16 shows an example of a flowchart showing the specific processing routine of the disk adapter 11 of the storage apparatus 4 concerning the ECCG page optimal arrangement processing for equally rearranging the empty pages in the ECC group 14 of the storage apparatus 4 in the storage system 1. Further, FIG. 17 is a conceptual diagram specifically explaining the ECCG page optimal arrangement processing routine. Moreover, FIG. 18 is a conceptual diagram schematically showing the contents of the ECCG page optimal arrangement processing.

When the disk adapter 11 receives an ECCG page optimal arrangement processing request for equally rearranging the empty pages in the ECC group 14, by executing the empty page equal arrangement processing program as the control program, it calculates the empty page count from the total page count and used page count for each ECCG ID, and creates an empty page count optimal arrangement table 33 showing the relationship of the page count (ECCG used page count) of empty pages in each ECC group 14, and the ECCG ID of the ECC group 14 of such pages by referring to the ECCG configuration information table 23 according to the empty page equal arrangement processing routine RT4 shown in FIG. 16 (FIG. 17 (1)) (SP31).

The disk adapter 11 thereafter sorts the ECCG ID and its corresponding empty page count in the empty page count optimal arrangement table 33 in descending order based on the empty page count (FIG. 17 (2)) (SP32).

Subsequently, the disk adapter 11 compares the leftmost empty page count and the rightmost empty page count, and checks whether the leftmost empty page count is a number that is equal to the rightmost empty page count+1, or whether the leftmost empty page count is a number that is smaller than the rightmost empty page count+1 (FIG. 17 (3)) (SP33).

When the leftmost empty page count is not a number that is equal to the rightmost empty page count+1, and the leftmost empty page count is not a number that is smaller than the rightmost empty page count+1; that is, when the leftmost empty page count is a number that is greater than the rightmost empty page count+1 (SP33: NO), the disk adapter 11 migrates one page worth of the empty pages not being used by the virtual volume 16 from the leftmost ECC group 14 to the rightmost ECC group 14 (SP34), thereafter once again returns to step SP32 for sorting the ECCG ID and its corresponding empty page count in the empty page count optimal arrangement table 33 in descending order based on the empty page count (FIG. 17 (2)), and then repeats the same processing (FIG. 17 (5)) (SP32 to SP34).

Incidentally, in the foregoing case, the disk adapter 11 is migrating one page worth of the empty pages not being used by the virtual volume 16 from the leftmost ECC group 14 to the rightmost ECC group 14 my migrating one page worth of the ECCG used pages being used by the virtual volume 16 from the rightmost ECC group 14 to the leftmost ECC group 14.

Contrarily, when the leftmost empty page count is a number that is equal to the rightmost empty page count+1, or the leftmost empty page count is a number that is smaller than the rightmost empty page count+1 (SP33: YES), the disk adapter 11 thereafter ends this empty page equal arrangement processing routine RT4 shown in FIG. 16 (SP35).

For example, as shown in FIG. 18, prior to executing the empty page equal arrangement processing, the empty page count is "1" page regarding the ECC group 14 (ECCG #1) with an ECCG ID of "1," the empty page count is "3" pages regarding the ECC group 14 (ECCG #2) with an ECCG ID of "2," and the empty page count is "3" pages regarding the ECC group 14 (ECCG #3) with an ECCG ID of "3."

Here, as shown in FIG. 18, after executing the empty page equal arrangement processing, the empty pages are equally arranged in the respective ECC groups 14, and the empty page count is "2" page regarding the ECC group 14 (ECCG #1) with an ECCG ID of "1," the empty page count is "2" pages regarding the ECC group 14 (ECCG #2) with an ECCG ID of "2," and the empty page count is "3" pages regarding the ECC group 14 (ECCG #3) with an ECCG ID of "3."

Like this, with the storage system 1, by equally rearranging the empty pages among the respective ECC groups 14, for example, even when the page count in each ECC group 14 is biased, the empty pages can be equally arranged. Thus, in particular, it is possible to effectively prevent the response performance to the host system 2 from deteriorating in a case where pages are to be equally allocated from the respective ECC groups 14 to the virtual volume 16.

Figure 19:
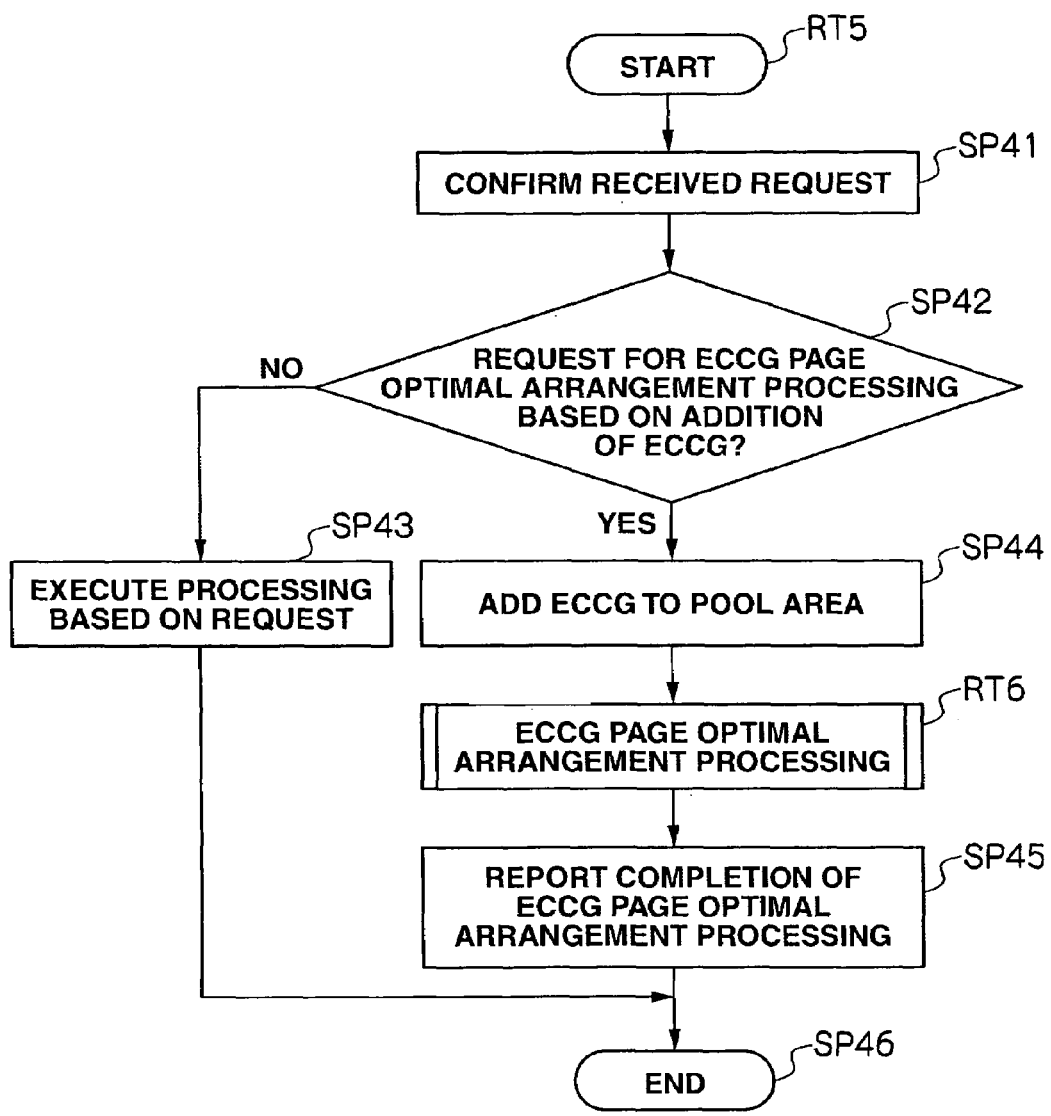
FIG. 19 is a flowchart showing a control processing routine.

FIG. 19 is an example of a flowchart showing the specific processing routine of the disk adapter 11 of the storage apparatus 4 concerning the control processing of the storage apparatus 4 in the storage system 1. Incidentally, this example focuses on a case where an ECCG addition request for adding an ECC group 14 based on the addition of a hard disk 13 is received together with an ECCG page optimal arrangement processing request.

When the disk adapter 11 receives some kind of request sent from the host system 2 or the service processor 12 based on the user's operation of such host system 2 or service processor 12, it confirms the received request according to the control processing routine RT5 shown in FIG. 19 by executing a control program (not shown) stored in a memory (not shown) in the disk adapter 11 (SP41).

Subsequently, the disk adapter 11 checks whether the request is an ECCG addition request and an ECCG page optimal arrangement processing request for optimally arranging the pages in the ECC group 14 (SP42).

When the request is not an ECCG addition request and an ECCG page optimal arrangement processing request (SP42: NO), the disk adapter 11 specifies the type of request that was sent, and executes processing based on such request (SP43), The disk adapter 11 thereafter ends the control processing routine RT5 shown in FIG. 19 (SP46).

Contrarily, when the request is an ECCG addition request and an ECCG page optimal arrangement processing request (SP42: YES), the disk adapter 11 adds the ECC group 14 of the ECCG ID corresponding to the ECCG addition request to the pool area 18, and adds the information of the ECC group 14 of such ECCG ID to the virtual VOL configuration information table 21, the virtual VOL address information table 22, the ECCG configuration information table 23, and the ECCG page configuration information table 24 (SP44).

The disk adapter 11 thereafter executes the ECCG page optimal arrangement processing (RT6).

Incidentally, in the case of the first embodiment, as the ECCG page optimal arrangement processing, a case is described regarding the ECCG page optimal arrangement processing (RT6) (described later) for rearranging pages in the ECC group 14 of low-performance disks when the ECC group with an ECCG ID of "4" as an HDD type "B" are added as per the ECCG configuration information table 23 of FIG. 21. Nevertheless, the present invention is not limited thereto, and, for instance, he ECCG page equal arrangement processing (RT2), the predetermined time access page equal arrangement processing (RT3), or the empty page equal arrangement processing (RT4) may be executed in a case where the ECC group of an ECCG ID where the HDD type is "A," and can also be applied to various other types of ECCG page optimal arrangement processing for optimally arranging the pages in the ECC group 14 when an ECC group 14 is added.

Subsequently, the disk adapter 11 sends an ECCG page optimal arrangement processing completion notice to the host system 2 so as to report the completion of the ECCG page optimal arrangement processing to the user of the host system 2 (SP45).

Eventually, the disk adapter 11 thereafter ends the control processing routine RT5 shown in FIG. 19 (SP46).

Figure 20:
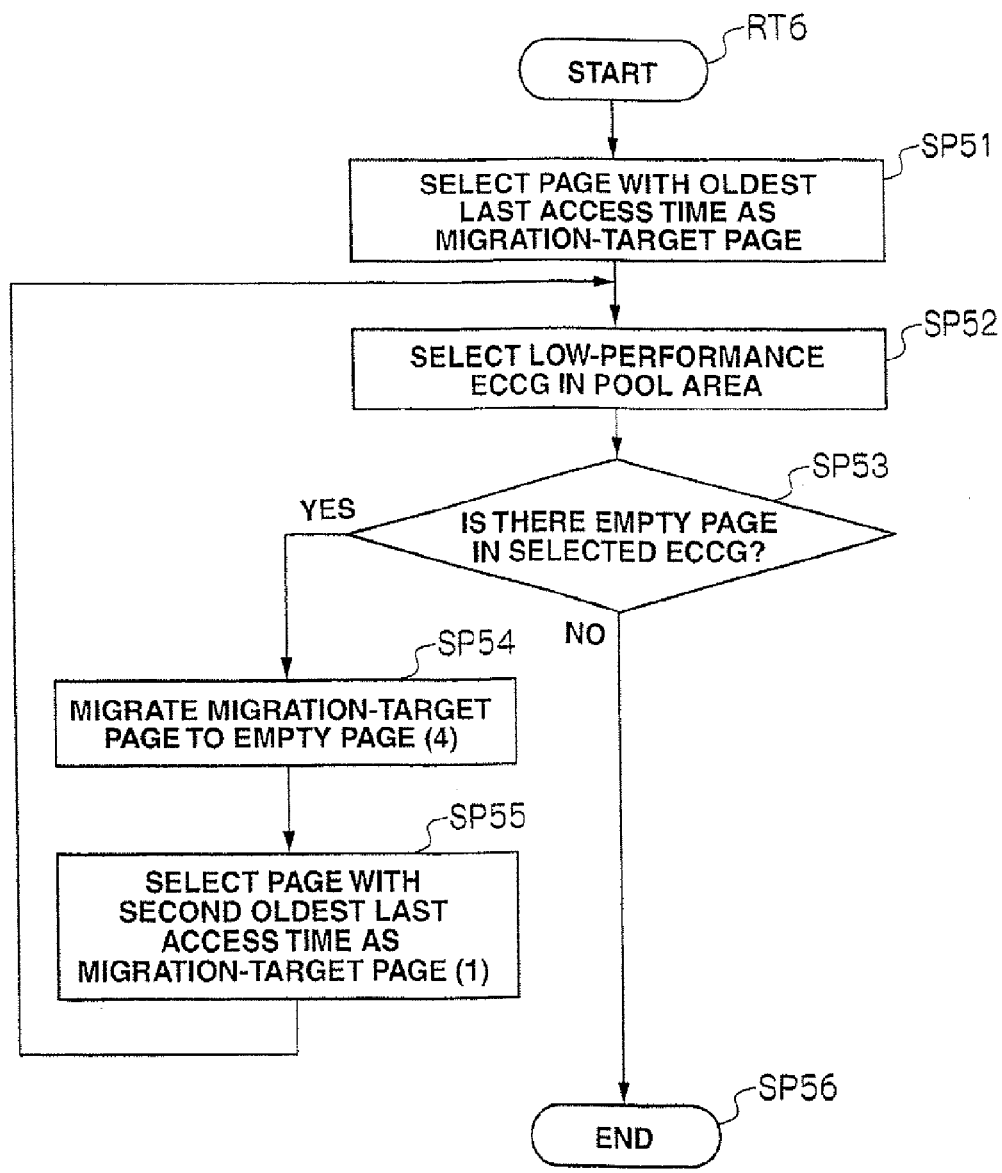
FIG. 20 is a flowchart showing a low-performance disk page arrangement processing routine.
Figure 22:
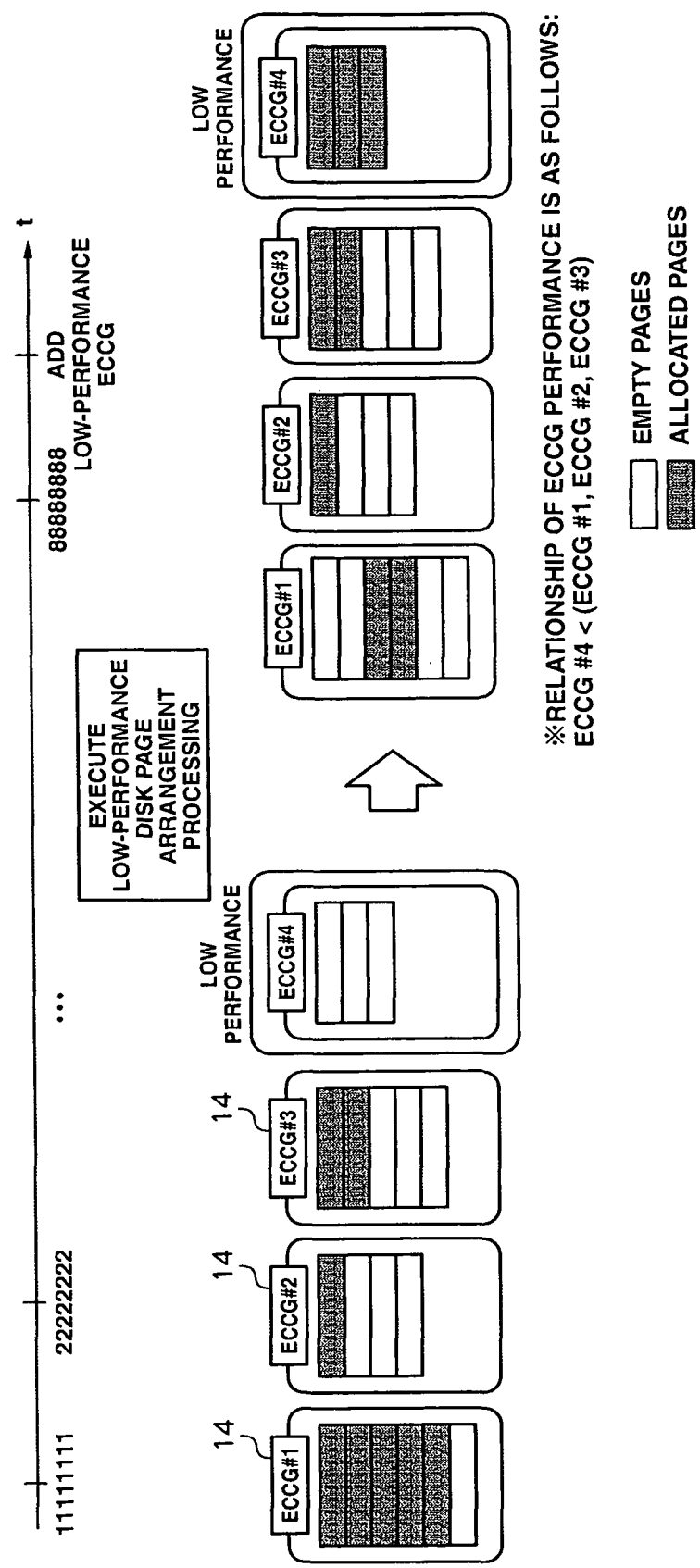
FIG. 22 is a conceptual diagram schematically showing the contents of low-performance disk page arrangement processing.

FIG. 20 is an example of a flowchart showing the specific processing routine of the disk adapter 11 of the storage apparatus 4 concerning the ECCG page optimal arrangement processing for equally rearranging the pages in the ECC group 14 of low-performance disks of the storage apparatus 4 in the storage system 1. Further, FIG. 21 is a conceptual diagram specifically explaining the ECCG page optimal arrangement processing routine. Moreover, FIG. 22 is a conceptual diagram schematically showing the contents of the ECCG page optimal arrangement processing.

When the disk adapter 11 receives an ECCG page optimal arrangement processing request for equally rearranging the pages in the ECC group 14 of low-performance disks, by executing the low-performance disk page arrangement processing program as the control program, it selects the page with a page ID having the oldest last access time in the ECCG page configuration information table 24 as the migration-target page by referring to the ECCG page configuration information table 24 according to the low-performance disk page arrangement processing routine RT6 shown in FIG. 20 (FIG. 21 (1)) (SP51).

Subsequently, the disk adapter 11 selects a low-performance ECCG in the pool area 18 from the ECCG configuration information table 23 by referring to the ECCG configuration information table 23 (FIG. 21 (2)) (SP52). In the case of FIG. 21, the disk adapter 11 selects the ECC group 14 with an ECCG ID "4" that is HDD type "B."

The disk adapter 11 thereafter calculates the empty page count from the total page count and used page count of the selected ECCG ID, and checks whether there is an empty page in the ECC group 14 of such ECCG ID (FIG. 21 (3)) (SP53).

When there is an empty page in the ECC group 14 of such ECCG ID (SP53: YES), the disk adapter 11 migrates the selected migration-target page to the empty page of the selected ECC group 14 (FIG. 21 (4)) (SP54).

In the case of FIG. 21, since it is determined that there is an empty page count from the total page count and used page count of the ECC group 14 with an ECCG ID "4," the disk adapter 11 migrates the allocation source of the page of allocation destination page ID "0" in the virtual volume 16 (virtual VOL #100) of allocation destination virtual VOL ID "100" from the page of ECCG internal page ID "0" in the ECC group 14 of ECCG ID "0," which is a page of page ID "0" that was accessed at last access time "11111111," to the page of ECCG internal page ID "0" of the ECC group 14 of ECCG ID "4," which is a page of page ID "15."

Subsequently, the disk adapter 11 selects a page of a page ID with the second oldest last access time in the ECCG page configuration information table 24 as the migration-target page by referring to the ECCG page configuration information table 24 (FIG. 21 (1)) (SP55), thereafter once again returns to step SP52 for selecting a low-performance ECCG in the pool area 18 from the ECCG configuration information table 23 (FIG. 21 (2)), and then repeats the same processing (SP52 to SP55).

Contrarily, there is no empty page in the ECC group 14 of such ECCG ID (SP53: NO), the disk adapter 11 does not migrate the selected migration-target page, and thereafter ends the low-performance disk page arrangement processing program routine RT6 shown in FIG. 20 (SP56).

For example, as shown in FIG. 22, let it be assumed that the pages are being accessed in the order of the last access time being "11111111," "22222222," and "88888888." Further, let it also be assumed that the ECC group 14 with an ECCG ID of "1," "2," "3" is higher than the performance of the ECC group 14 with an ECCG ID of "4." Prior to executing the low-performance disk page arrangement processing, the pages accessed at the last access time of "11111111," "22222222," "88888888," "77777777," and "33333333" are allocated to the virtual volume 16 regarding the ECC group 14 (ECCG #1) with an ECCG ID of "1." The page accessed at the last access time of "44444444" is allocated to the virtual volume 16 regarding the ECC group 14 (ECCG #2) with an ECCG ID of "2," and the pages accessed at the last access time of "66666666" and "55555555" are allocated to the virtual volume 16 regarding the ECC group 14 (ECCG #3) with an ECCG ID of "3."

Here, as shown in FIG. 22, after executing the low-performance disk page arrangement processing, pages with old last access time are rearranged in the pages in the ECC group 14 of low-performance disks, and the pages accessed at the last access time of "11111111," "22222222," and "33333333" are allocated to the virtual volume 16 regarding the ECC group 14 (ECCG #4) with an ECCG ID of "4."

Like this, with the storage system 1, since pages with old last access time are rearranged in the pages in the ECC group 14 of low-performance disks, for instance, it is possible to arrange pages that are not frequently accessed to the ECC group 14 of low-performance disks, and to arrange pages that are frequently accessed to the ECC group 14 with high-performance disks. Thus, in particular, it is possible to effectively prevent the response performance to the host system 2 from deteriorating in a case where a specific page is frequently accessed.

As described above, in the first embodiment, the storage system 1 is able to optimally rearrange the pages in each ECC group 14 being used by the virtual volume 16 among the respective ECC groups 14. Thus, it is possible to effectively prevent deterioration in the response performance to the host system 2 caused by an allocated page in each ECC group 14 being used by the virtual volume 16 becoming biased, and increased access to a specific ECC group 14.

(2) Second Embodiment

Figure 23:
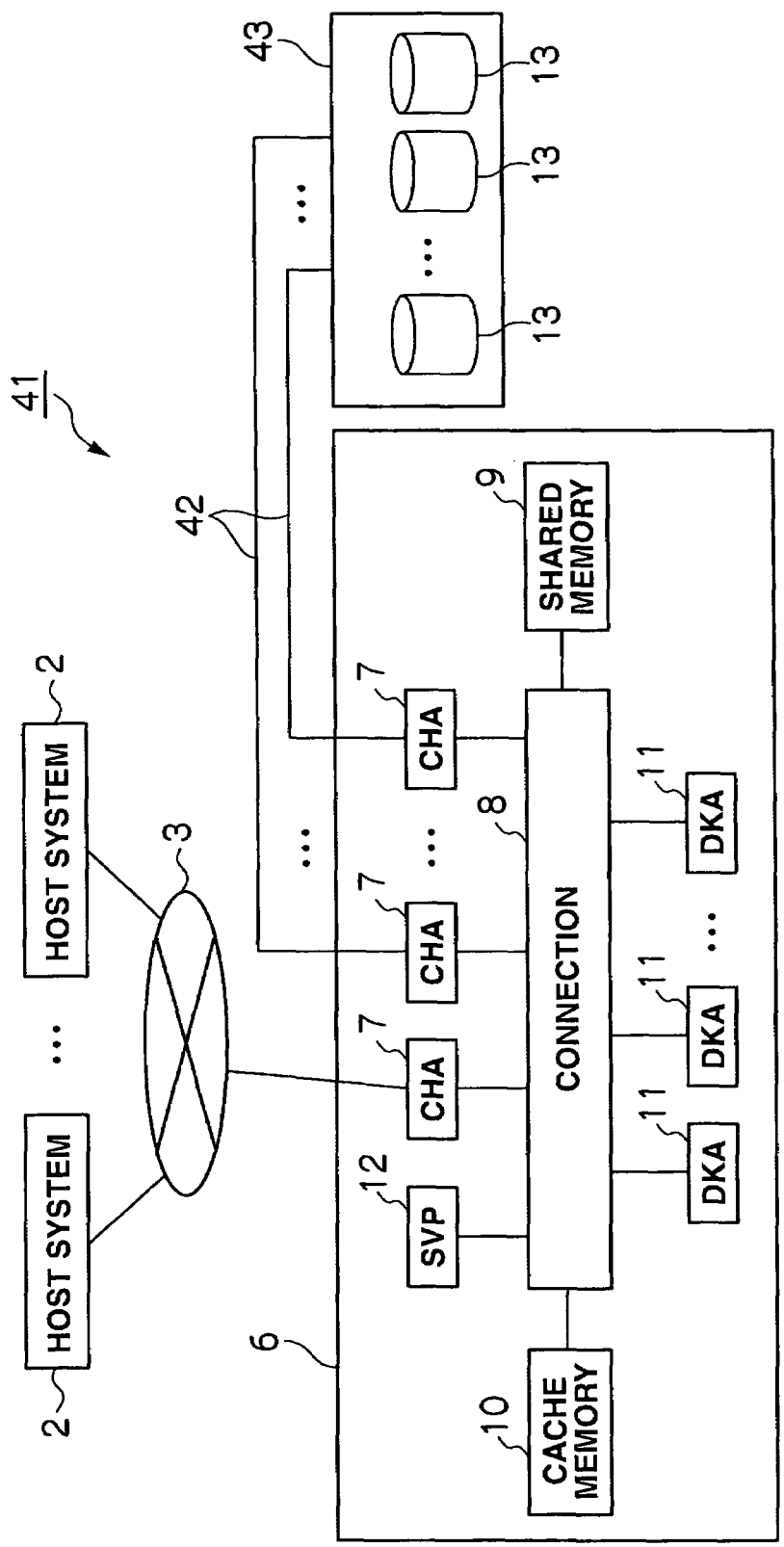
FIG. 23 is a block diagram showing a schematic configuration of a storage system according to another embodiment of the present invention.

FIG. 23 shows a storage system 41 according to the second embodiment. The storage system 41 is configured by a host system 2 being connected to a storage apparatus 4 via a network 3, and a plurality of channel adapters 7 being connected to an external disk device 43 via a network 42. The storage system 41 is configured the same as the first embodiment excluding the point that the respective channel adapters 7 execute the foregoing control processing.

In other words, with the external disk device 43 also, as with the first embodiment, among the plurality of hard disks 13, one ECC group 14 is configured for each set of four hard disks 13. One or more logical volumes 15 are defined on the storage area provided by one ECC group 14.

Among the respective logical volumes 15, a unique identifier is allocated to the logical volume 15 designated by the user. In the case of the first embodiment, the I/O of data is conducted by combining this identifier and a unique number allocated to the respective blocks to be the address, and designating such address.

Here, as attributes of the logical volume 15, they can be broadly classified as a virtual volume 16 and a pool volume 17. A pool area 18 is formed from a plurality of pool volumes 17. The virtual volume 16 is provided with a storage area by the storage area of the hard disk 13 in the pool volume 17 of the pool area 18 being dynamically allocated thereto.

In the case of the second embodiment, the virtual volume 16 will be managed by the controller 6, and the ECC group 14 and the pool volume 17 will be managed by the external disk device 43.

Therefore, in the second embodiment, the controller 6 is not able to recognize the hard disk 13, ECC group 14 and pool volume 17 being managed by the external disk device 43, and it is not possible to manage pages for each ECC group 14.

In order to deal with this problem, in the second embodiment, the pages of the hard disk 13 and ECC group 14 being managed by the external disk device 43 are managed for each channel adapter 7 connected to the external disk device 43. The channel adapter to manage the pages of the external disk device 43 is hereinafter referred to as a port 7.

Nevertheless, even when the pages are manager for each port 7 as described above, there are cases when the allocated pages being used by the virtual volume 16 will become biased. This will result in the increased access to a prescribed port 7, and there is a risk that the overall response performance to requests from the host system 2 becoming deteriorated.

Thus, the port management page optimal arrangement processing for optimally arranging the pages managed by the port 7 is explained below.

Figure 24:
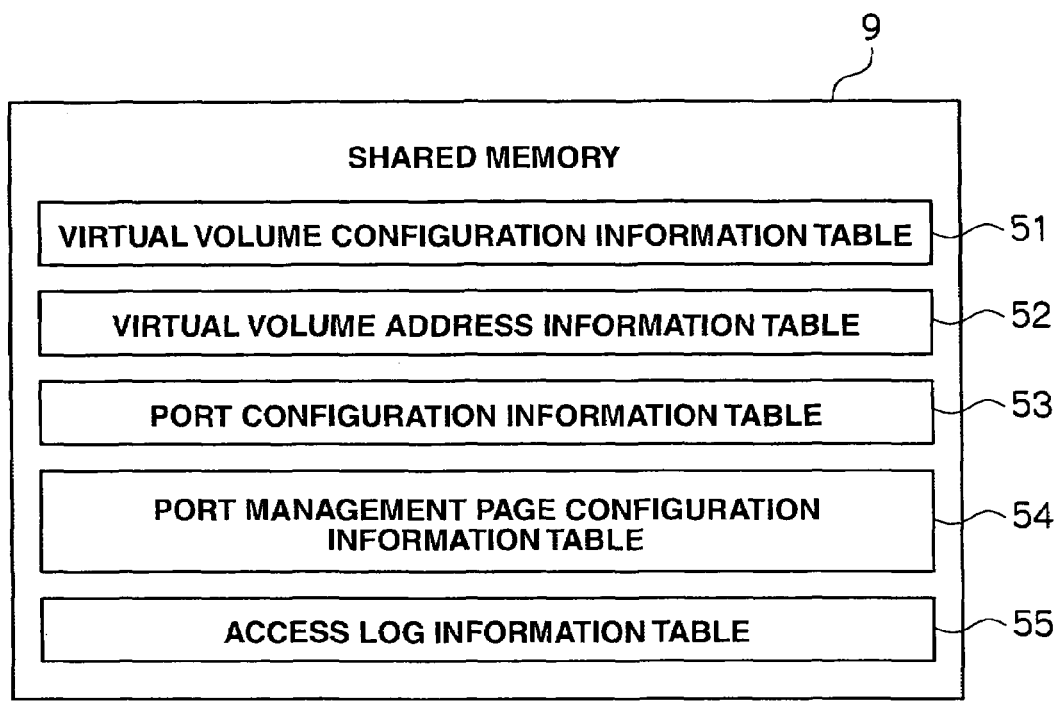
FIG. 24 is a conceptual diagram explaining the various tables stored in a shared memory.

FIG. 24 shows an example of the various tables stored in the shared memory 9 in the second embodiment. The shared memory 9 is configured from a virtual VOL configuration information table 51, a virtual VOL address information table 52, a port configuration information table 53 for managing the configuration information of the ports 7, a port management page configuration information table 54 for managing the configuration information of pages managed by the ports 7, and an access log information table 25 for managing the access log of pages managed by the ports 7.

FIG. 25 shows an example of the configuration of the virtual VOL configuration information table 51. The virtual VOL configuration information table 51 is configured from an index column 51A, a virtual VOL ID column 51B, a virtual VOL size column 51C, an allocated page count column 51D, and a port used page count column 51E for managing the number of pages managed by the ports 7 being used by the virtual volume 16 based on each port ID, which is an identifier for uniquely identifying the port 7.

FIG. 26 shows an example of the configuration of the virtual VOL address configuration information table 52. The virtual VOL address configuration information table 52 is configured from a virtual VOL ID column 52A, a virtual VOL internal page ID column 52B, a port ID column 52C for managing the port ID, and a port management page ID column 52D for managing the port management page ID, which is an identifier for uniquely identifying the pages managed by the ports 7.

For example, in the case of the second embodiment, the page of port management page ID "0" managed by the port 7 (port #1) with a port ID of "1" is allocated to the page of virtual VOL page ID "0" in the virtual volume 16 (virtual VOL #100) with a virtual VOL ID of "100."

FIG. 27 shows an example of the configuration of the port configuration information table 53. The port configuration information table 53 is configured from a port ID column 53A, a start page column 53B for managing the start page managed by the corresponding port 7 among the page IDs, which are identifiers for uniquely identifying the pages, an end page column 53C for managing the end page managed by the corresponding port 7 among the page IDs, a total page count column 53D for managing the total page count managed by the port 7, and a used page count 53E for managing the number of pages used in the virtual volume 16.

In the case of the second embodiment, since the controller 6 is not able to recognize the hard disks 13 managed by the external disk device 43 as described above, it is not able to manage the HDD type. Thus, the HDD type is not managed here.

For example, in the case of this embodiment, regarding the port 7 (port #1) with a port ID of "1," the page ID of the start page is "0," the page ID of the end page is "6," the total page count is "6," and the used page count is "5."

FIG. 28 shows an example of the configuration of the port management page configuration information table 54. The port management page configuration information table 54 is configured from a page ID column 54A, a port ID column 54B, an port management page ID column 54C, an allocation destination virtual VOL ID column 54D, an allocation destination page ID column 54E, and a last access time column 54F.

For example, in the case of the second embodiment, a page with a page ID of "0" is a page with a port management page ID of "0" in the port 7 with a port ID of "1." Further, a page with a page ID of "0" is allocated to the virtual storage area with a virtual VOL internal page ID of "0" in the virtual volume 16 (virtual VOL #100) with an allocation destination virtual VOL ID of "100." Further, a page with a page ID of "0" shows that it was last accessed at time "11111111."

FIG. 29 shows an example of the configuration of the access log information table 55. The access log information table 55 is configured from an access time column 55A, a port ID column 55B, and a port management page ID column 55C.

For example, in the case of the second embodiment, the page of port management page ID "0" in the port 7 with a port ID of "1" was accessed at time "11111111."

Figure 30:
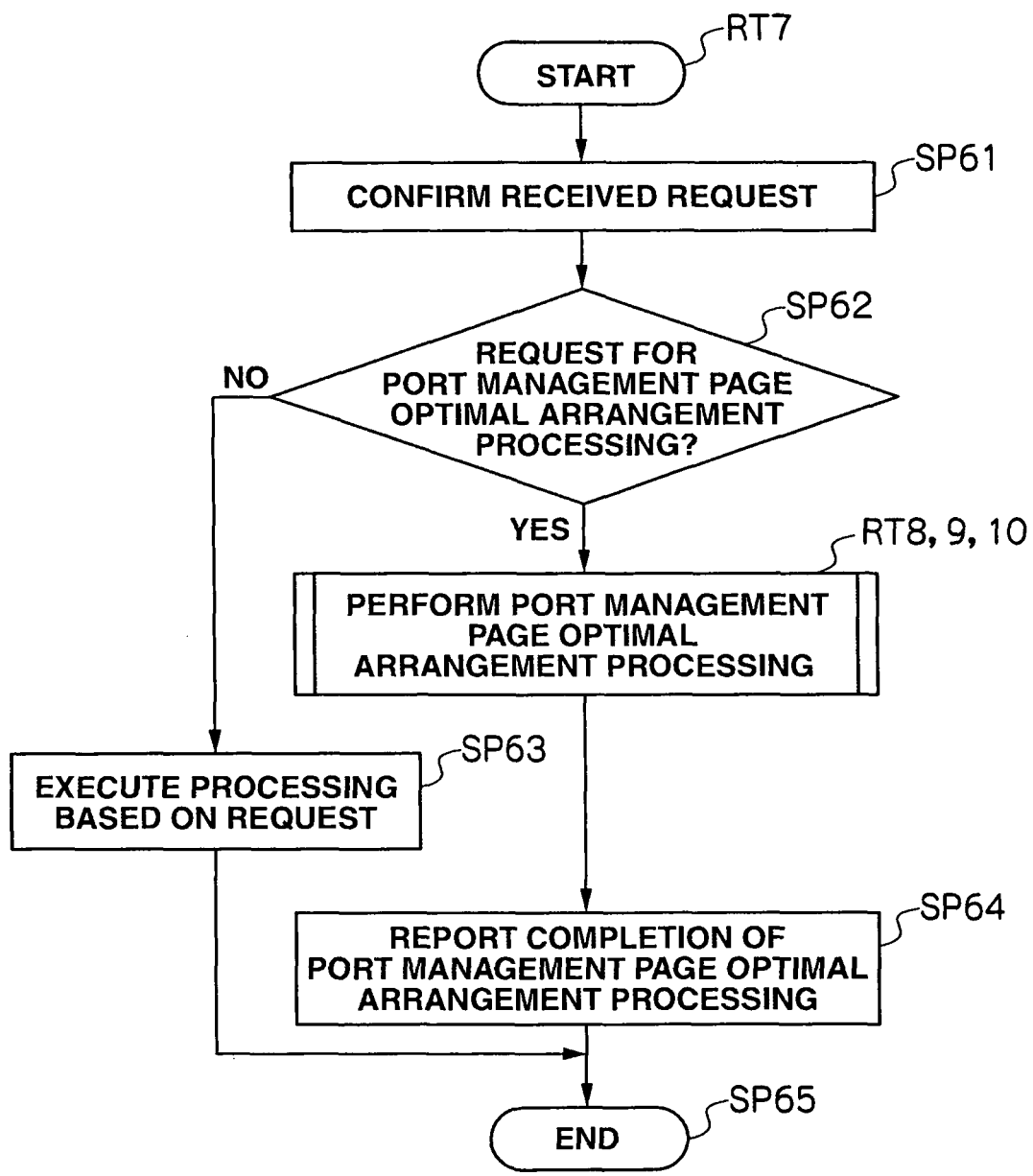
FIG. 30 is a flowchart showing a control processing routine.

FIG. 30 is an example of a flowchart showing the specific processing routine of the channel adapter 7 (port 7) of the controller 6 concerning the control processing of the storage apparatus 4 in the storage system 1.

When the channel adapter 7 receives some kind of request sent from the host system 2 or the service processor 12 based on the user's operation of such host system 2 or service processor 12, it confirms the received request according to the control processing routine RT7 shown in FIG. 30 by executing a control program (not shown), which is stored in a memory (not shown) in the channel adapter 7, for performing the control processing of the channel adapter 7 based on the request (SP61).

Subsequently, the channel adapter 7 checks whether the request is a port management page optimal arrangement processing request for optimally arranging the pages in the port 7 (SP62).

When the request is not a port management page optimal arrangement processing request (SP62: NO), the channel adapter 7 specifies the type of request that was sent, and executes processing based on such request (SP63), The channel adapter 7 thereafter ends the control processing routine RT7 shown in FIG. 30 (SP65).

Contrarily, when the request is a port management page optimal arrangement processing request (SP62: YES), the channel adapter 7 executes such port management page optimal arrangement processing (RT8, 9, 10).

Incidentally, in the case of this embodiment, described as the port management page optimal arrangement processing are, for instance, port management page optimal arrangement processing (RT8) for equally rearranging the pages managed by each port being used by the virtual volume 16, port management page optimal arrangement processing (RT9) for equally rearranging the pages managed by the port that was accessed within a prescribed time, and port management page optimal arrangement processing (RT10) for equally rearranging the empty pages managed by the port (all described later). Nevertheless, the present invention is not limited thereto, and can be applied to various other types of port management page optimal arrangement processing for optimally arranging the pages managed by the port.

Subsequently, the channel adapter 7 sends a port management page optimal arrangement processing completion notice to the host system 2 so as to report the completion of the port management page optimal arrangement processing to the user of the host system 2 (SP64).

Eventually, the channel adapter 7 thereafter ends the control processing routine RT7 shown in FIG. 30 (SP65).

Figure 31:
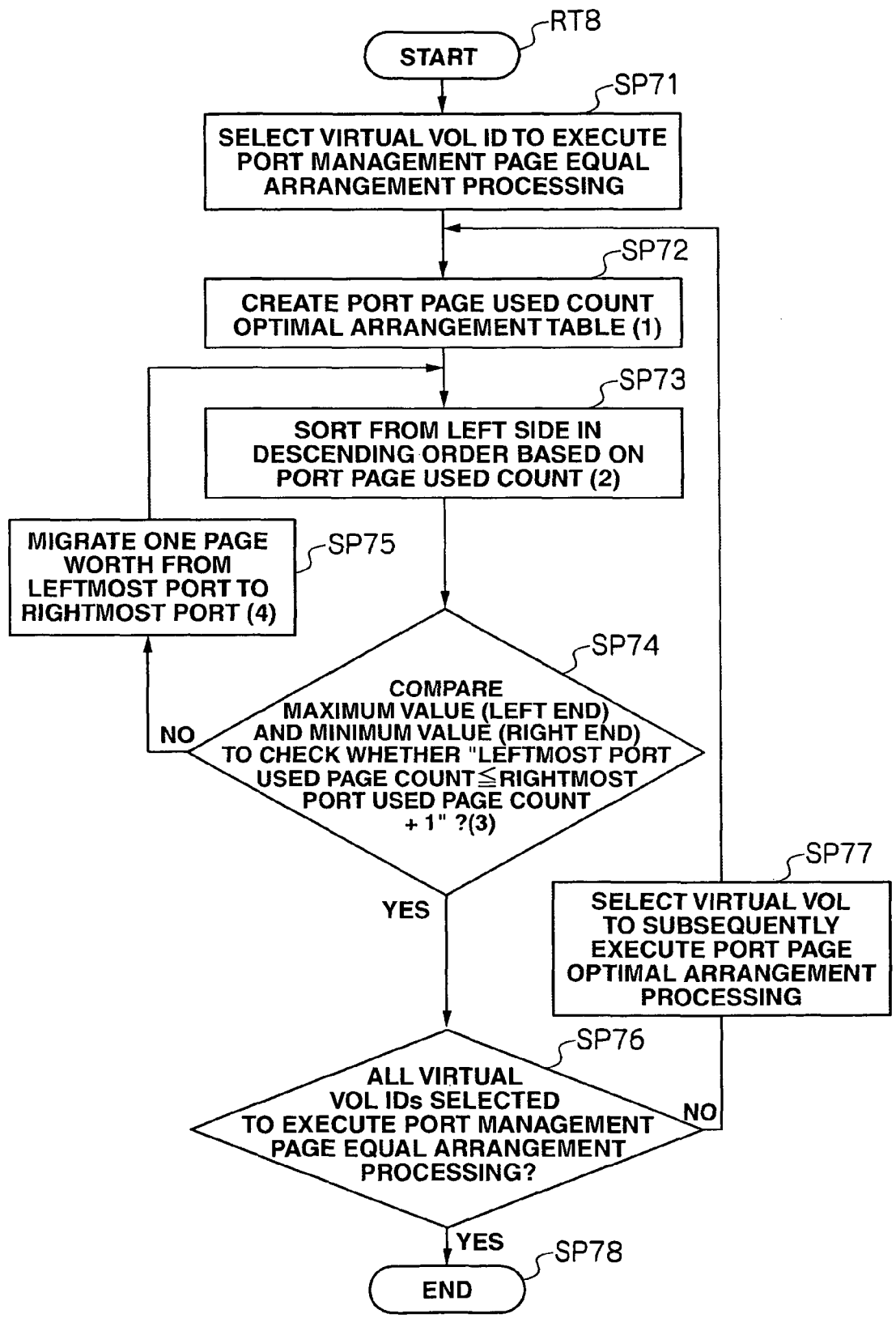
FIG. 31 is a flowchart showing a port management page equal arrangement processing routine.
Figure 32:
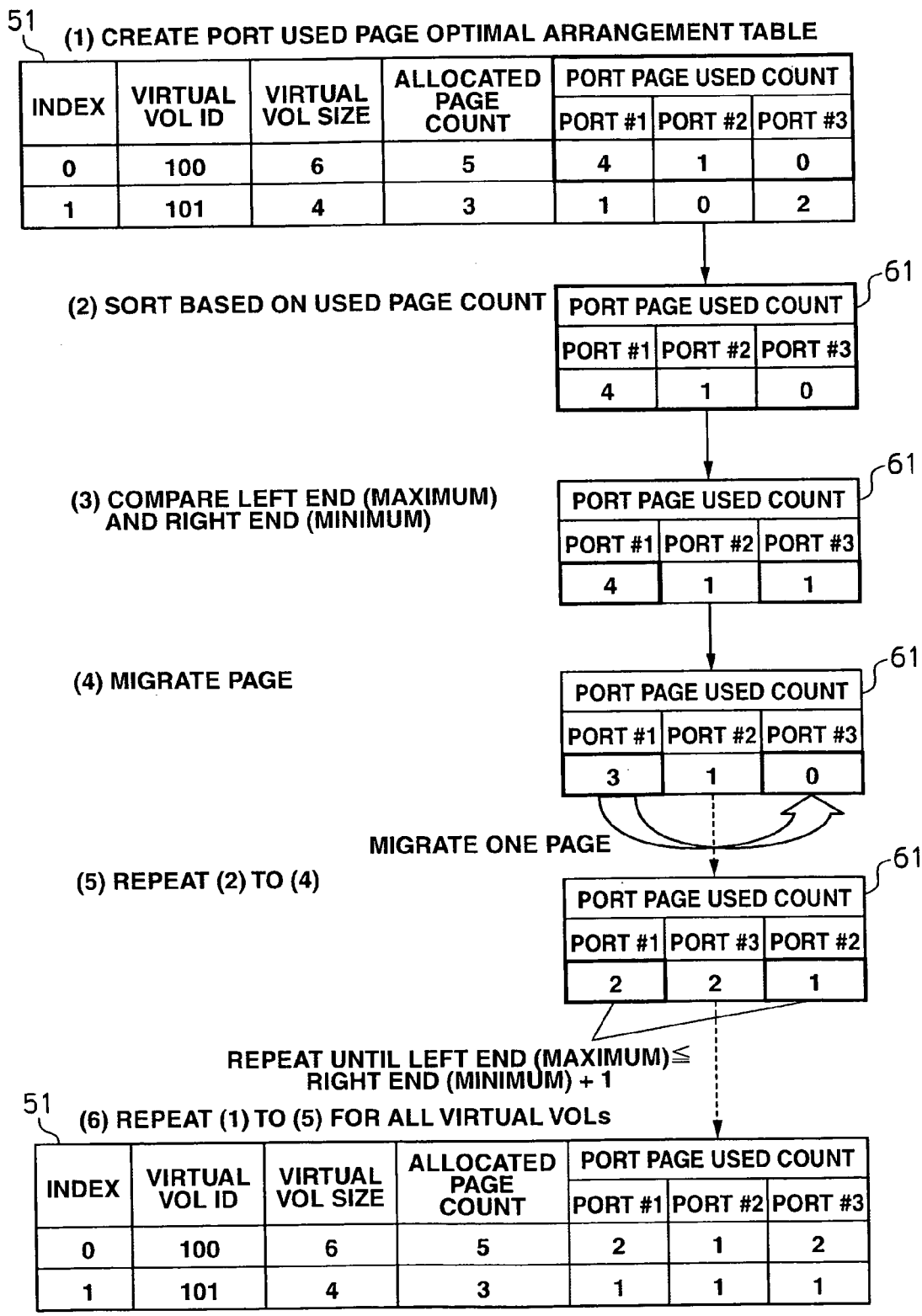
FIG. 32 is a conceptual diagram explaining the port management page equal arrangement processing routine.
Figure 33:
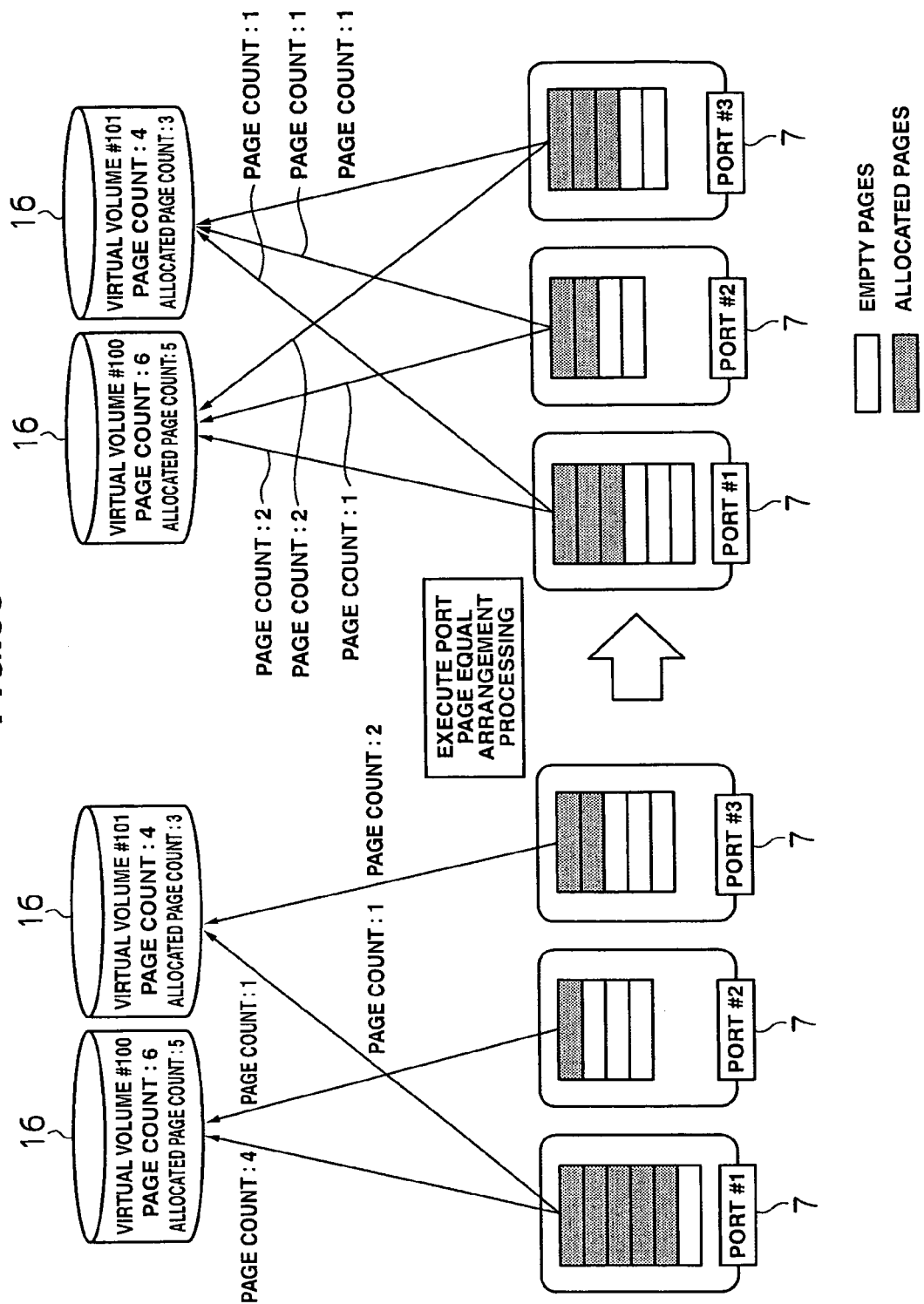
FIG. 33 is a conceptual diagram schematically showing the contents of port management page equal arrangement processing.

FIG. 31 is an example of a flowchart showing the specific processing routine of the channel adapter 7 of the controller 6 concerning the port management page optimal arrangement processing for equally rearranging the pages managed by the port 7 being used by the virtual volume 16 of the controller 6 in the storage system 1. Further, FIG. 32 is a conceptual diagram specifically explaining the port management page optimal arrangement processing routine. Moreover, FIG. 33 is a conceptual diagram schematically showing the contents of the port management page optimal arrangement processing.

When the channel adapter 7 receives a port management page optimal arrangement processing request for equally rearranging the pages managed by the port 7 being used by the virtual volume 16, by executing the port management page equal arrangement processing program as the control program, it selects the virtual VOL ID of the virtual volume 16 to execute the port management page equal arrangement processing from the virtual VOL ID column 51A of the virtual VOL configuration information table 51 by referring to the virtual VOL configuration information table 51 according to the port management page equal arrangement processing routine RT8 shown in FIG. 31 (SP71).

Subsequently, the channel adapter 7 extracts the port used page count for each port 7 of the selected virtual VOL ID, and creates a port used page count optimal arrangement table 61 showing the relationship of the page count (port used page count) managed by the port 7 being used the virtual volume 16, and the port ID of the port 7 of that page (FIG. 32 (1)) (SP72).

The channel adapter 7 thereafter sorts the port ID and its corresponding port used page count in the port used page count optimal arrangement table 61 in descending order based on the port used page count (FIG. 32 (2)) (SP73). In other words, the channel adapter 7 switches the port ID an its corresponding port used page count so that the port ID with a higher port used page count will be located farther left in the port used page optimal arrangement table 61.

Subsequently, the channel adapter 7 compares the port used page count with the largest port used page count (port used page count is a maximum value) at the leftmost part of the port used page count optimal arrangement table 61, and the port used page count with the smallest port used page count (port used page count is a minimum value) at the rightmost part of the port used page count optimal arrangement table 61, and then checks whether the leftmost port used page count is a number that is equal to the rightmost port used page count+1, or whether the leftmost port used page count is a number that is smaller than the rightmost port used page count+1 (FIG. 32 (3)) (SP74).

When the leftmost port used page count is not a number that is equal to the rightmost port used page count+1, and the leftmost port used page count is not a number that is smaller than the rightmost port used page count+1; that is, when the leftmost port used page count is a number that is greater than the rightmost port used page count+1 (SP74: NO), the channel adapter 7 migrates one page worth of the pages managed by the port 7 and being used by the virtual volume 16 from the leftmost port 7 to the rightmost port 7 (SP75), thereafter once again returns to step SP73 for sorting the port ID and its corresponding port used page count in the port used page count optimal arrangement table 61 in descending order based on the port used page count (FIG. 32 (2)), and then repeats the same processing (FIG. 32 (5)) (SP73 to SP75).

Incidentally, when data is stored in the page of the migration source, the channel adapter 7 is also instructed by the external disk device 43 to migrate the page stored in the page of the migration source to the page of the migration destination.

Contrarily, when the leftmost port used page count is a number that is equal to the rightmost port used page count+1, or the leftmost port used page count is a number that is smaller than the rightmost port used page count+1 (SP74: YES), the channel adapter 7 checks whether the port management page optimal arrangement processing was performed by selecting the virtual VOL ID of all virtual volumes 16 from the virtual VOL ID column 51A of the virtual VOL configuration information table 51 (SP76).

When the port management page optimal arrangement processing was not performed by selecting the virtual VOL ID of all virtual volumes 16 from the virtual VOL ID column 51A of the virtual VOL configuration information table 51 (SP76: NO), the channel adapter 7 selects the virtual VOL ID of the virtual volume 16 to subsequently execute the port management page optimal arrangement processing from the virtual VOL ID column 51A of the virtual VOL configuration information table 51 by referring to the virtual VOL configuration information table 51 (SP77), thereafter once again returns to step SP72 for extracting the port used page count for each port 7 of the selected virtual VOL ID, and creating the port used page count optimal arrangement table 61 (FIG. 32 (1)), and then repeats the same processing (FIG. 32 (6)) (SP72 to SP77).

Contrarily, when the port management page optimal arrangement processing was performed by selecting the virtual VOL ID of all virtual volumes 16 from the virtual VOL ID column 51A of the virtual VOL configuration information table 51 (SP76: YES), the channel adapter 7 thereafter ends the port management page equal arrangement processing routine RT8 shown in FIG. 31 (SP78).

For example, as shown in FIG. 33, prior to executing the port management page equal arrangement processing, regarding the virtual volume 16 (virtual VOL #100) with a virtual VOL ID of "100," the virtual VOL size (page count) is "6" pages, and the allocated page count among the virtual VOL size is "5" pages. Further, regarding the virtual volume 16 (virtual VOL #100) with a virtual VOL ID of "100," "4" pages are allocated as the page count from the port 7 (port #1) with a port ID of "1" among the allocated page count, and "1" page is allocated as the page count from the port 7 (port #2) with a port ID of "2."

As shown in FIG. 33, after executing the port management page equal arrangement processing, regarding the virtual volume 16 (virtual VOL #100) with a virtual VOL ID of "100," the pages managed by each port 7 being used by the virtual volume 16 are equally rearranged in each port 7, "2" pages as the page count are allocated from the port 7 (port #1) with a port ID of "1," "1" page as the page count is allocated from the port 7 (port #2) with a port ID of "2," and "2" pages as the page count are allocated from the port 7 (port #3) with a port ID of "3" among the allocated page count.

Further, as shown in FIG. 33, prior to executing the port management page equal arrangement processing, regarding the virtual volume 16 (virtual VOL #101) with a virtual VOL ID of "101," the virtual VOL size (page count) is "4" pages, and the allocated page count among the virtual VOL size is "3" pages. Further, regarding the virtual volume 16 (virtual VOL #101) with a virtual VOL ID of "101," "1" page is allocated as the page count from the port 7 (port #1) with a port ID of "1" among the allocated page count, and "2" pages are allocated as the page count from the port 7 (port #3) with a port ID of "3."

Here, as shown in FIG. 33, after executing the port management page equal arrangement processing, regarding the virtual volume 16 (virtual VOL #101) with a virtual VOL ID of "101," the pages managed by each port 7 being used by the virtual volume 16 are equally rearranged, "1" page as the page count is allocated from the port 7 (port #1) with a port ID of "1," "1" page as the page count is allocated from the port 7 (port #2) with a port ID of "2," and "1" page as the page count is allocated from the port 7 (port #3) with a port ID of "3" among the allocated page count.

Like this, with the storage system 41, since the pages managed by each port 7 being used by the virtual volume 16 are equally rearranged even when the controller 6 is not able to recognize the hard disk 13, ECC group 14 and pool volume 17 managed by the external disk device 43, it is possible to effectively prevent deterioration in the response performance to the host system 2 caused by an allocated page managed by each port 7 being used by the virtual volume 16 becoming biased.

Figure 34:
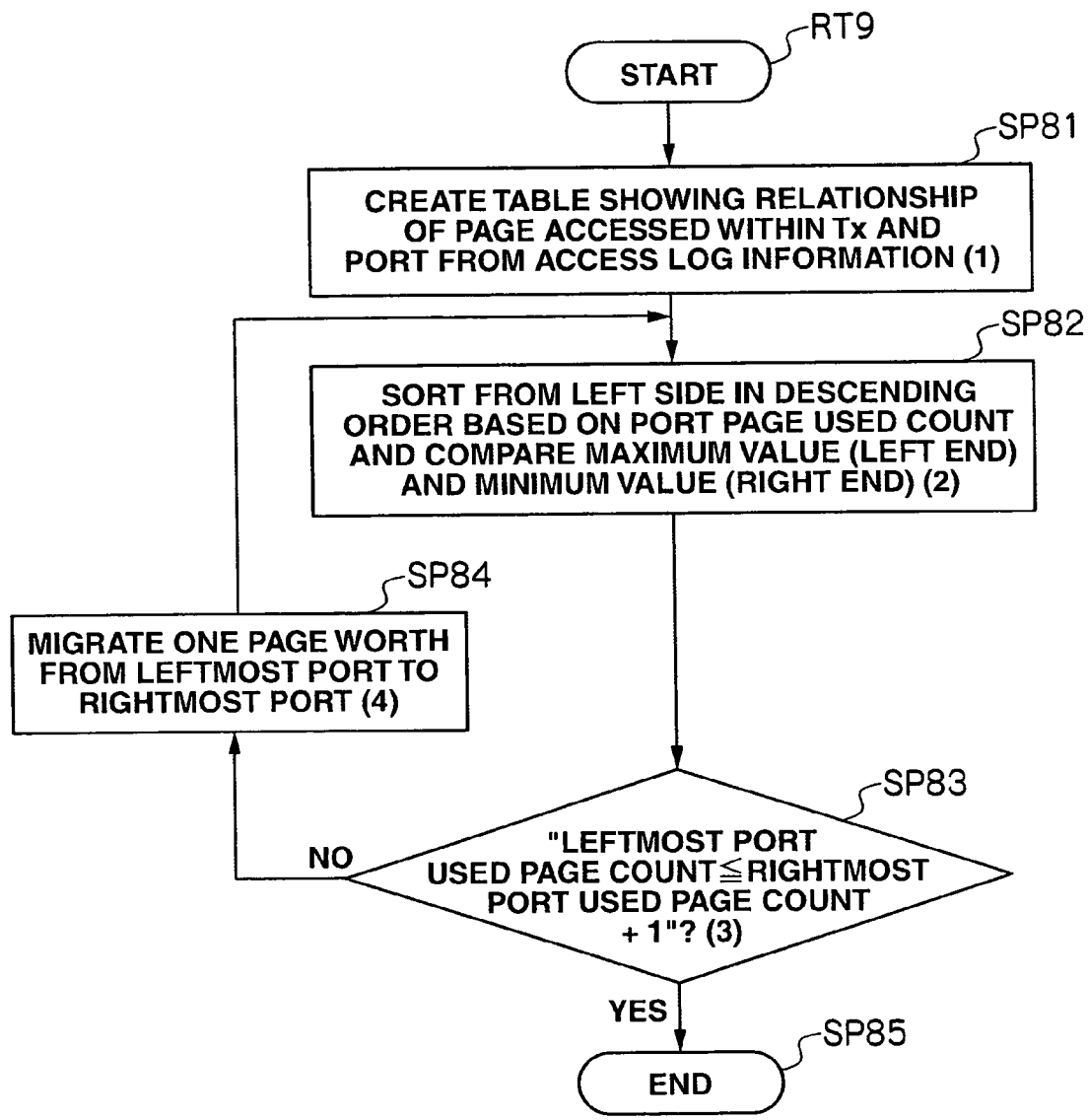
FIG. 34 is a flowchart showing a predetermined time access page equal arrangement processing routine.
Figure 35:
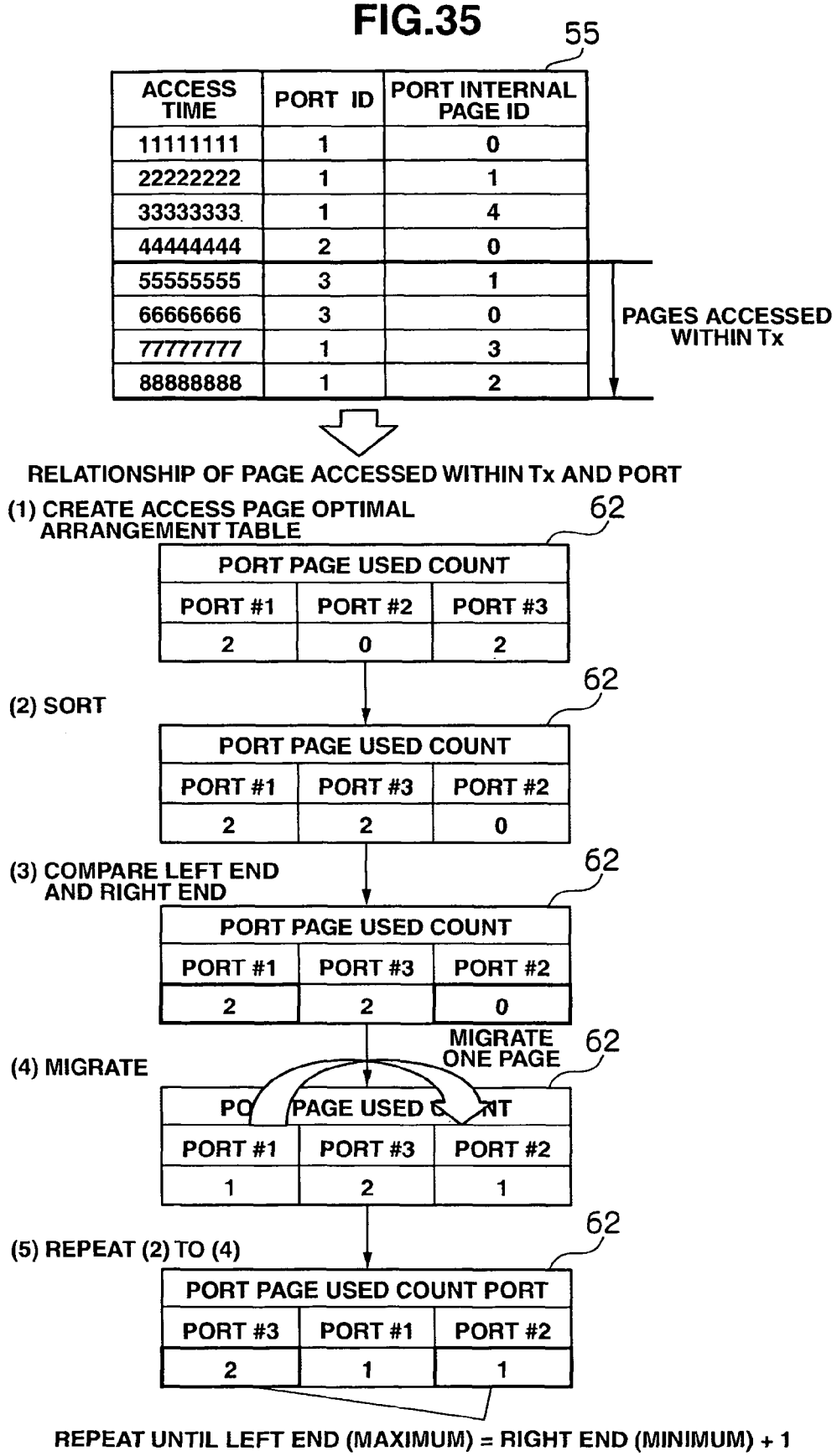
FIG. 35 is a conceptual diagram explaining the predetermined time access page equal arrangement processing routine.
Figure 36:
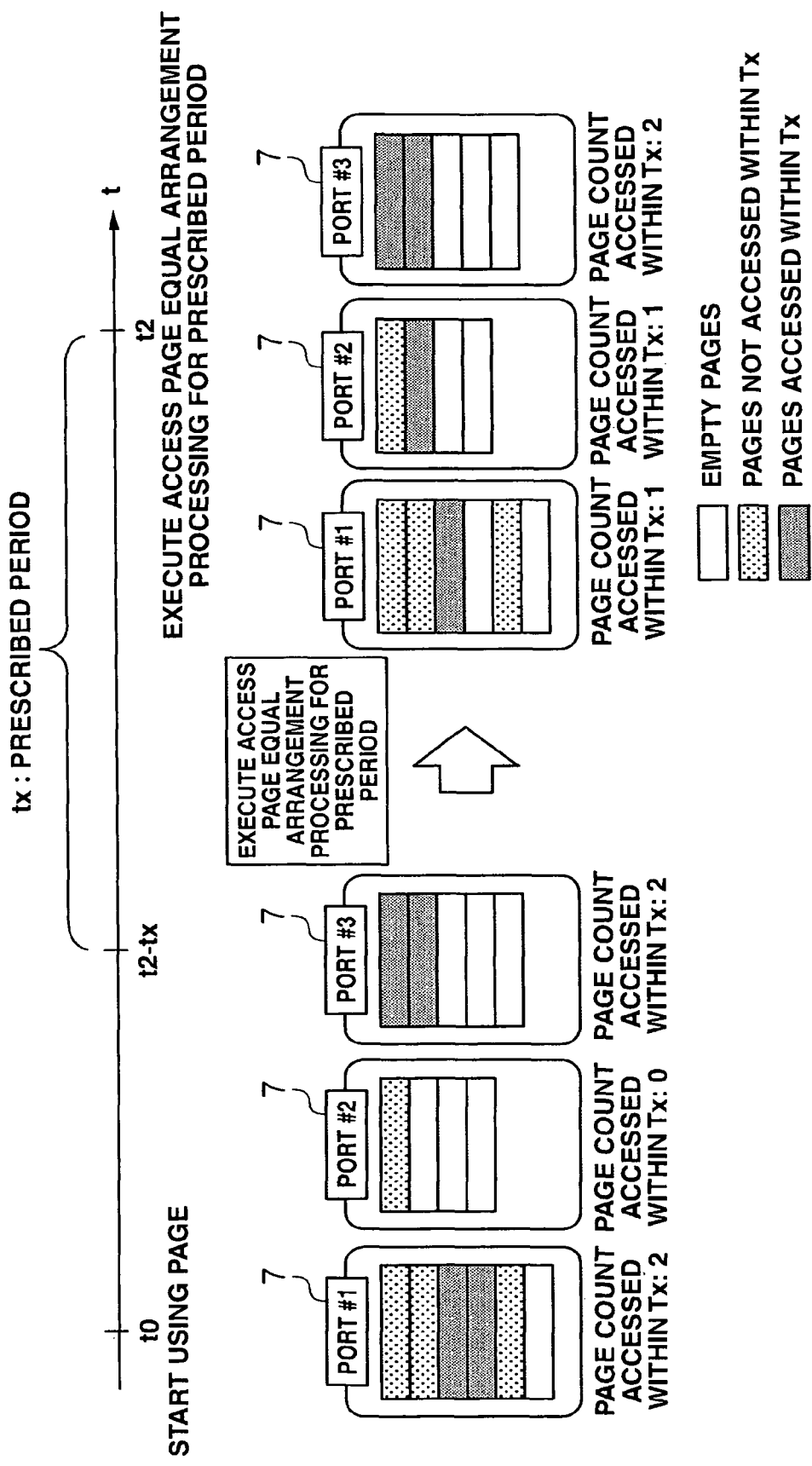
FIG. 36 is a conceptual diagram schematically showing the contents of predetermined time access page equal arrangement processing.

FIG. 34 is an example of a flowchart showing the specific processing routine of the channel adapter 7 of the controller 6 concerning the port management page optimal arrangement processing for equally rearranging the pages managed by the port 7 that were accessed within a prescribed time of the controller 6 in the storage system 41. Further, FIG. 35 is a conceptual diagram specifically explaining the port management page optimal arrangement processing routine. Moreover, FIG. 36 is a conceptual diagram schematically showing the contents of the port management page optimal arrangement processing.

When the channel adapter 7 receives a port management page optimal arrangement processing request for equally rearranging the pages managed by the port 7 that were accessed within a prescribed time, by executing the predetermined time access page equal arrangement processing program as the control program, it extracts the pages managed by the port 7 that were accessed within the time designated by the user of the host system 2 contained in the port management page optimal arrangement processing request, and creates an access page count optimal arrangement table 62 showing the relationship of the page count (port used page count) managed by each port 7 regarding the pages that were accessed within the time designated by the user of the host system 2, and the port ID of the port 7 of such pages by referring to the access log information table 25 according to the predetermined time access page equal arrangement processing routine RT9 shown in FIG. 34 (FIG. 35(1)) (SP81).

For example, in the second embodiment, the channel adapter 7 extracts the pages managed by the port 7 that were accessed from time "Tx" up to the port management page optimal arrangement processing, and then creates the access page count optimal arrangement table 62 (FIG. 35(1)).

The channel adapter 7 thereafter sorts the port ID and its corresponding port used page count in the access page count optimal arrangement table 62 in descending order based on the port used page count (FIG. 35(2)) (SP82).

Subsequently, the channel adapter 7 compares the leftmost port used page count and the rightmost port used page count, and checks whether the leftmost port used page count is a number that is equal to the rightmost port used page count+1, or whether the leftmost port used page count is a number that is smaller than the rightmost port used page count+1 (FIG. 35(3)) (SP83).

When the leftmost port used page count is not a number that is equal to the rightmost port used page count+1, and the leftmost port used page count is not a number that is smaller than the rightmost port used page count+1; that is, when the leftmost port used page count is a number that is greater than the rightmost port used page count+1 (SP83: NO), the channel adapter 7 migrates one page worth of the pages managed by the port and being used by the virtual volume 16 from the leftmost port 7 to the rightmost port 7 (SP84), thereafter once again returns to step SP82 for sorting the port ID and its corresponding port used page count in the access page count optimal arrangement table 62 in descending order based on the port used page count (FIG. 35(2)), and then repeats the same processing (FIG. 35(5)) (SP82 to SP84).

Contrarily, when the leftmost port used page count is a number that is equal to the rightmost port used page count+1, or the leftmost port used page count is a number that is smaller than the rightmost port used page count+1 (SP83: YES), the channel adapter 7 thereafter ends this predetermined time access page equal arrangement processing routine RT9 shown in FIG. 34 (SP85).

For example, as shown in FIG. 36, let it be assumed that the start of page use is "t0," the time that the predetermined time access page equal arrangement processing was executed is "t2," and the time designated by the user of the host system 2 included in the predetermined time access page equal arrangement processing request is "Tx." Here, prior to executing the predetermined time access page equal arrangement processing, the accessed page count from time "Tx" up to the predetermined time access page equal arrangement processing is "2" pages regarding the port 7 (port #1) with a port ID of "1," the accessed page count from time "Tx" up to the predetermined time access page equal arrangement processing is "0" pages regarding the port 7 (port #2) with a port ID of "2", and the accessed page count from time "Tx" up to the predetermined time access page equal arrangement processing is "2" pages regarding the port 7 (port #3) with a port ID of "3".

Here, as shown in FIG. 36, after the execution of the predetermined time access page equal arrangement processing, the pages that were accessed from time "Tx" up to the predetermined time access page equal arrangement processing are equally arranged in each port 7, and the accessed page count from time "Tx" up to the predetermined time access page equal arrangement processing is "1" page regarding the port 7 (port #1) with a port ID of "1," the accessed page count from time "Tx" up to the predetermined time access page equal arrangement processing is "1" page regarding the port 7 (port #2) with a port ID of "2", and the accessed page count from time "Tx" up to the predetermined time access page equal arrangement processing is "2" pages regarding the port 7 (port #3) with a port ID of "3".

Like this, with the storage system 41, pages that were accessed within a prescribed time are equally rearranged among the respective ECC groups 14 even in cases where the controller is not able to recognize the hard disk 13, ECC group 14 and pool volume 17 managed by the external disk device 43. Thus, for instance, since it is possible to equally rearrange the pages that were recently accessed, in particular, it is possible to effectively prevent the response performance to the host system 2 at the present moment from deteriorating.

Figure 37:
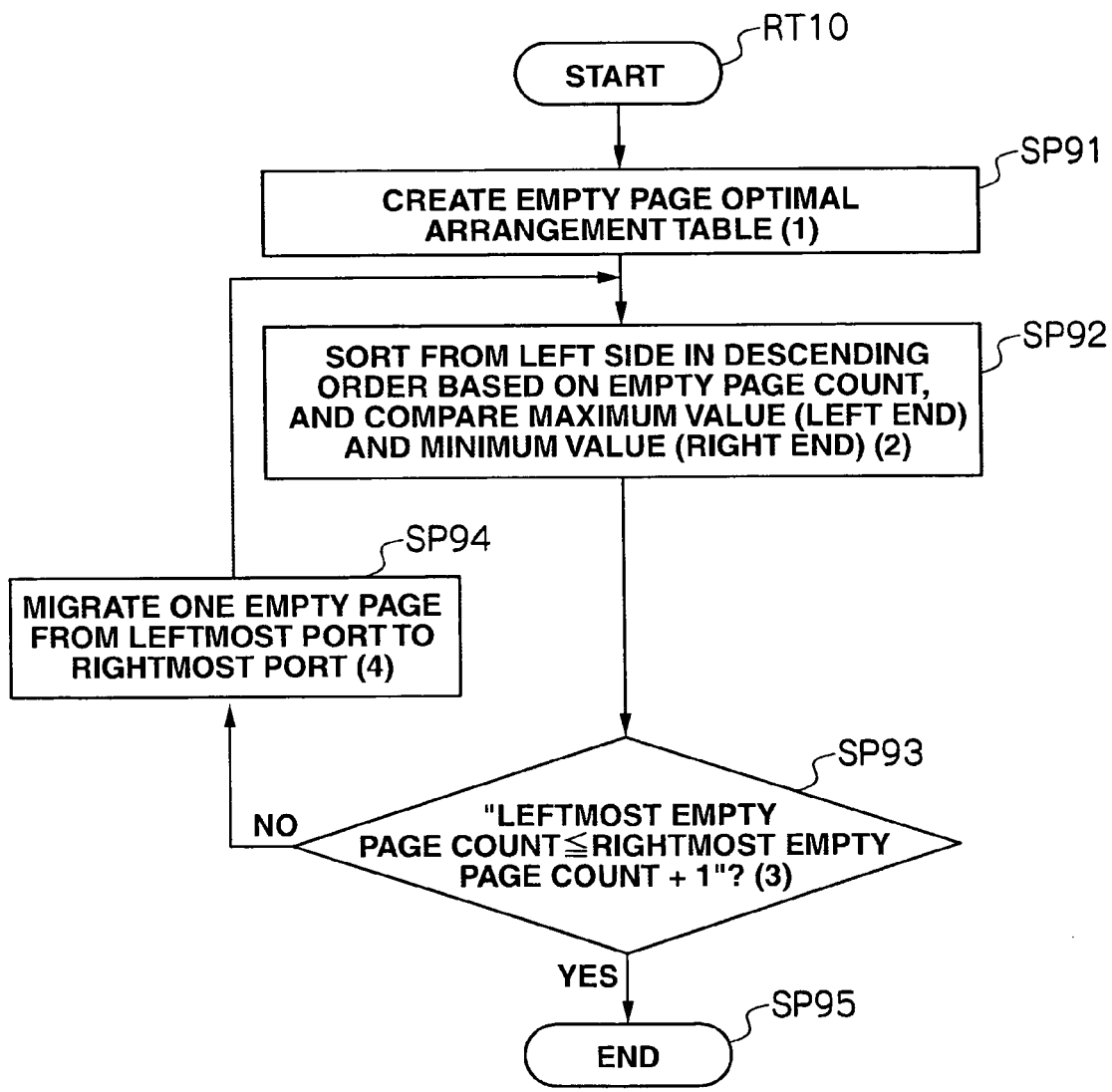
FIG. 37 is a flowchart showing an empty page equal arrangement processing routine.
Figure 38:
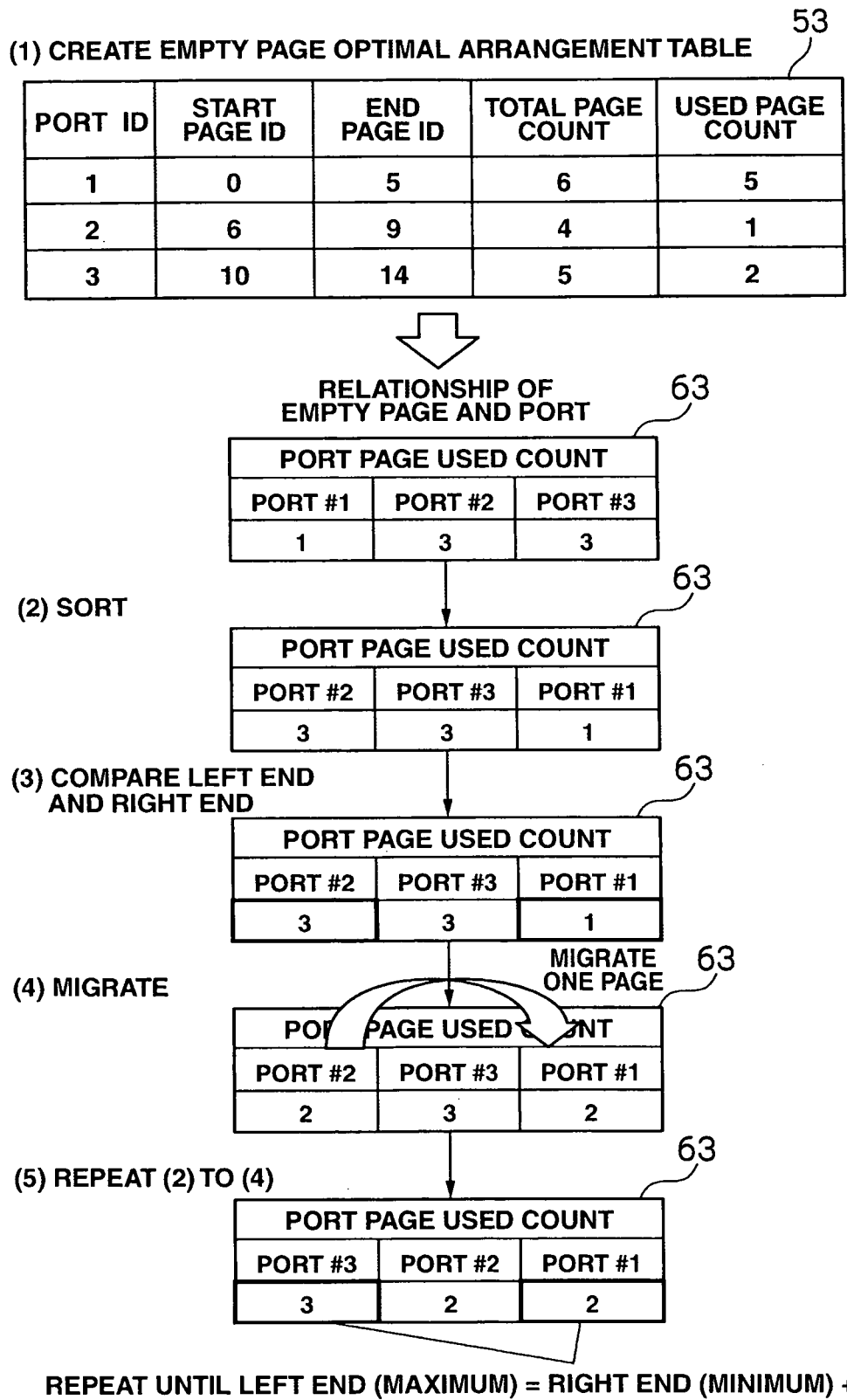
FIG. 38 is a conceptual diagram explaining the empty page equal arrangement processing routine.
Figure 39:
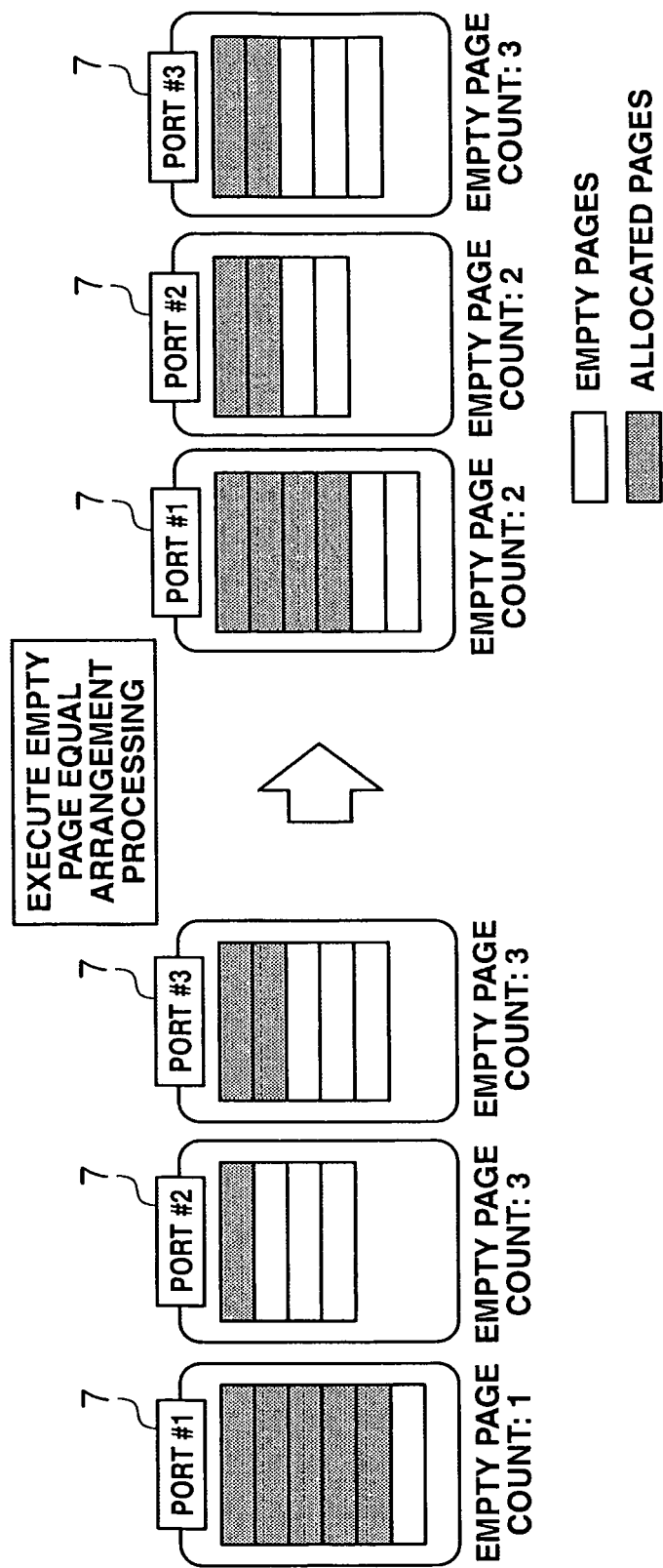
FIG. 39 is a conceptual diagram schematically showing the contents of empty page equal arrangement processing.

FIG. 37 shows an example of a flowchart showing the specific processing routine of the channel adapter 7 of the controller 6 concerning the port management page optimal arrangement processing for equally rearranging the empty pages managed by the port 7 of the controller 6 in the storage system 1. Further, FIG. 38 is a conceptual diagram specifically explaining the port management page optimal arrangement processing routine. Moreover, FIG. 39 is a conceptual diagram schematically showing the contents of the port management page optimal arrangement processing.

When the channel adapter 7 receives a port management page optimal arrangement processing request for equally rearranging the empty pages managed by the port 7, by executing the empty page equal arrangement processing program as the control program, it calculates the empty page count from the total page count and used page count for each port ID, and creates an empty page count optimal arrangement table 63 showing the relationship of the page count (port used page count) of empty pages managed by the port 7, and the port ID of the port 7 of such pages by referring to the port configuration information table 53 according to the empty page equal arrangement processing routine RT10 shown in FIG. 37 (FIG. 38(1)) (SP91).

The channel adapter 7 thereafter sorts the port ID and its corresponding empty page count in the empty page count optimal arrangement table 63 in descending order based on the empty page count (FIG. 38(2)) (SP92).

Subsequently, the channel adapter 7 compares the leftmost empty page count and the rightmost empty page count, and checks whether the leftmost empty page count is a number that is equal to the rightmost empty page count+1, or whether the leftmost empty page count is a number that is smaller than the rightmost empty page count+1 (FIG. 38(3)) (SP93).

When the leftmost empty page count is not a number that is equal to the rightmost empty page count+1, and the leftmost empty page count is not a number that is smaller than the rightmost empty page count+1; that is, when the leftmost empty page count is a number that is greater than the rightmost empty page count+1 (SP93: NO), the channel adapter 7 migrates one page worth of the empty pages not being used by the virtual volume 16 from the leftmost port 7 to the rightmost port 7 (SP94), thereafter once again returns to step SP92 for sorting the port ID and its corresponding empty page count in the empty page count optimal arrangement table 33 in descending order based on the empty page count (FIG. 38(2)), and then repeats the same processing (FIG. 38(5)) (SP92 to SP94).

Incidentally, in the foregoing case, the channel adapter 7 is migrating one page worth of the empty pages not being used by the virtual volume 16 from the leftmost port 7 to the rightmost port 7 my migrating one page worth of the port used pages being used by the virtual volume 16 from the rightmost port 7 to the leftmost port 7.

Contrarily, when the leftmost empty page count is a number that is equal to the rightmost empty page count+1, or the leftmost empty page count is a number that is smaller than the rightmost empty page count+1 (SP93: YES), the channel adapter 7 thereafter ends this empty page equal arrangement processing routine RT10 shown in FIG. 37 (SP95).

For example, as shown in FIG. 39, prior to executing the empty page equal arrangement processing, the empty page count is "1" page regarding the port 7 (port #1) with a port ID of "1," the empty page count is "3" pages regarding the port 7 (port #2) with a port ID of "2," and the empty page count is "3" pages regarding the port 7 (port #3) with a port ID of "3."

Here, as shown in FIG. 39, after executing the empty page equal arrangement processing, the empty pages managed by each port 7 are equally arranged, and the empty page count is "2" page regarding the port 7 (port #1) with a port ID of "1," the empty page count is "2" pages regarding the port 7 (port #2) with a port ID of "2," and the empty page count is "3" pages regarding the port 7 (port #3) with a port ID of "3."

Like this, with the storage system 41, by equally rearranging the empty pages managed by each port 7 even in cases where the controller 6 is not able to recognize the hard disk 13, ECC group 14 and pool volume 17 managed by the external disk device 43, for example, even when the page count managed by each port 7 is biased, the empty pages can be equally arranged. Thus, in particular, it is possible to effectively prevent the response performance to the host system 2 from deteriorating in a case where pages are to be equally allocated from the respective ports 7 to the virtual volume 16.

Figure 40:
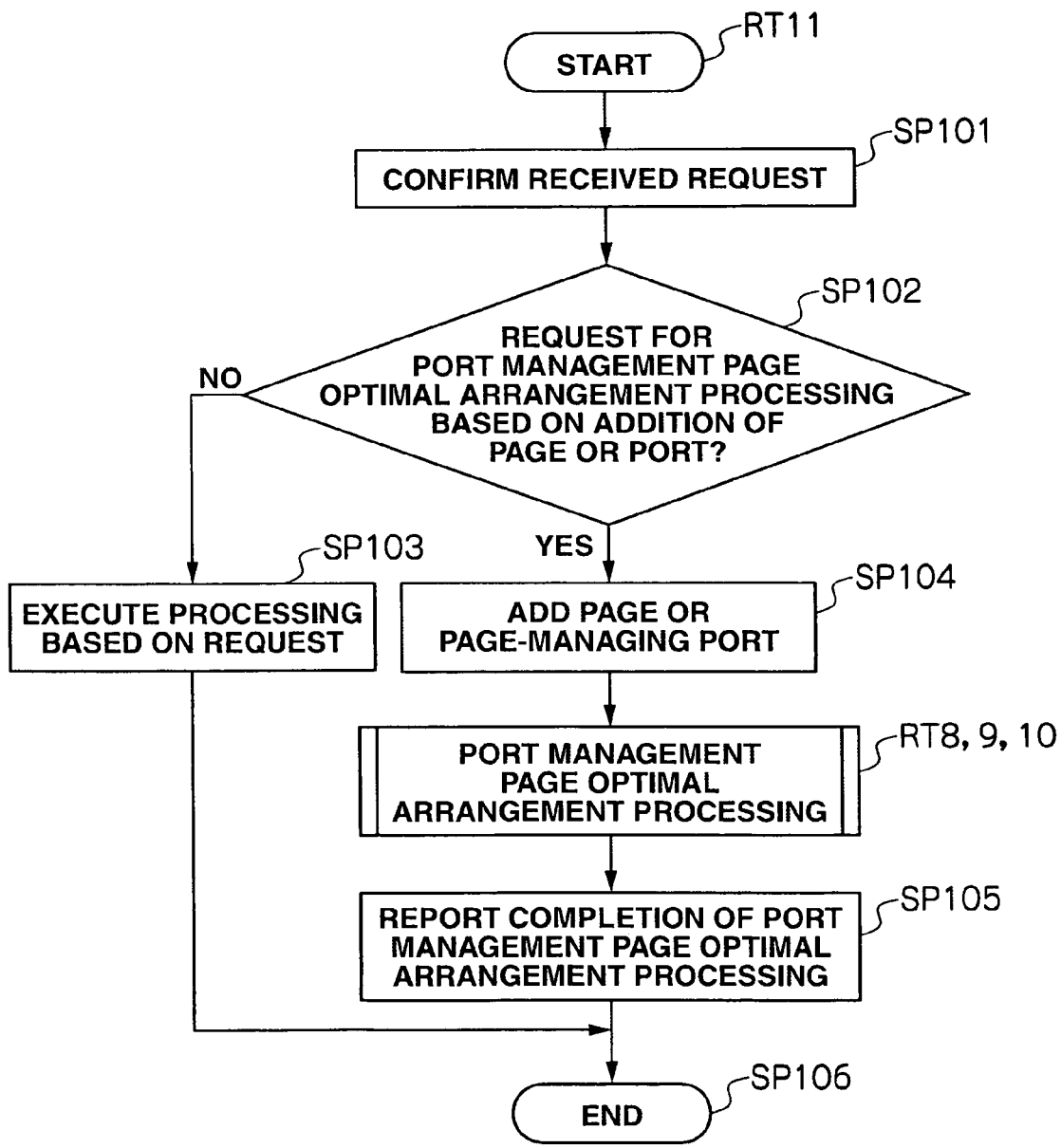
FIG. 40 is a flowchart showing the control processing routine.

FIG. 40 is an example of a flowchart showing the specific processing routine of the channel adapter 7 of the controller 6 concerning the control processing of the controller 6 in the storage system 41. Incidentally, this example focuses on a case of where a port addition request for adding a new port 7 for managing pages or adding a part to an existing port 7 based on the addition of a hard disk 13 is received together with a port management page optimal arrangement processing request.

When the channel adapter 7 receives some kind of request sent from the host system 2 or the service processor 12 based on the user's operation of such host system 2 or service processor 12, it confirms the received request according to the control processing routine RT11 shown in FIG. 40 by executing a control program (not shown) stored in a memory (not shown) in the channel adapter 7 (SP101).

Subsequently, the channel adapter 7 checks whether the request is a port addition request and a port management page optimal arrangement processing request for optimally arranging the pages in the port 7 (SP102).

When the request is not a port addition request and a port management page optimal arrangement processing request (SP102: NO), the channel adapter 7 specifies the type of request that was sent, and executes processing based on such request (SP103), The channel adapter 7 thereafter ends the control processing routine RT11 shown in FIG. 40 (SP106).

Contrarily, when the request is a port addition request and a port management page optimal arrangement processing request (SP102: YES), the channel adapter 7 adds the port 7 of the port ID corresponding to the port addition request to the pool area 18, and adds the information of the port 7 of such port ID to the virtual VOL configuration information table 51, the virtual VOL address information table 52, the port configuration information table 53, and the port management page configuration information table 54 (SP104).

The channel adapter 7 thereafter executes the port management page optimal arrangement processing (RT8, 9, 10).

Subsequently, the channel adapter 7 sends a port management page optimal arrangement processing completion notice to the host system 2 so as to report the completion of the port management page optimal arrangement processing to the user of the host system 2 (SP105).

Eventually, the channel adapter 7 thereafter ends the control processing routine RT11 shown in FIG. 40 (SP106).

Like this, in the second embodiment, the storage system 41 is able to optimally arrange the pages managed by each port 7 and being used by the virtual volume 16 even in cases where the controller is not able to recognize the hard disk 13, ECC group 14 and pool volume 17 managed by the external disk device 43. Thus, in particular, it is possible to effectively prevent the response performance to the host system 2 from deteriorating in a case where a specific page is frequently accessed as a result of the allocated pages managed by each port and being used by the virtual volume 16 becoming biased.

The present invention can be broadly applied to storage apparatuses that provide a storage area, which is capable of dynamically enhancing its capacity, to a host system.

We claim:

1. A storage apparatus providing a first virtual volume and a second virtual volume, each having a plurality of virtual storage areas, to a host system comprising:

a plurality of disk drives; and a controller that is configured to:

configure a plurality of error correcting code (ECC) groups with the plurality of disk drives, each of the plurality of ECC groups being allocated a plurality of storage areas as a capacity from the plurality of disk drives;

allocate the capacity respectively from the plurality of ECC groups to at least one of the plurality of virtual storage areas of the first virtual volume and the second virtual volume dynamically in accordance with a received request from the host system;

manage configuration information that represents a first capacity, a second capacity, a third capacity, and a fourth capacity, the first capacity being a capacity allocated to the first virtual volume and belonging to a first ECC group, the second capacity being a capacity allocated to the first virtual volume and belonging to a second ECC group, the third capacity being a capacity allocated to the second virtual volume and belonging to the first ECC group, and the fourth capacity being a capacity allocated to the second virtual volume and belonging to the second ECC group; and execute a rearranging process in which:

comparing the first capacity to the second capacity, and if the first capacity is larger than the second capacity and a difference between the first capacity and the second capacity is larger than a threshold partially based on the configuration information, at least one storage area of a plurality of first storage areas is migrated to at least one storage area of a plurality of second storage areas in order to make the difference between the first capacity and the second capacity smaller, and comparing the third capacity to the fourth capacity, and if the third capacity is larger than the fourth capacity and a difference between the third capacity and the fourth capacity is larger than a threshold partially based on the configuration information, at least one storage area of a plurality of third storage areas is migrated to at least one storage area of a plurality of fourth storage areas in order to make the difference between the third capacity and the fourth capacity smaller.

2. The storage apparatus according to claim 1, wherein the controller is further configured to rearrange the plurality of storage areas in the ECC groups used by the first virtual volume to become equal among the plurality of ECC groups based on the configuration information.

3. The storage apparatus according to claim 1, wherein the controller is further configured to rearrange the plurality of storage areas in the ECC groups accessed within a prescribed time to become equal among the plurality of ECC groups based on the configuration information.

4. The storage apparatus according to claim 1, wherein the controller is further configured to rearrange the plurality of storage areas in the ECC groups not used by the first virtual volume to become equal among the plurality of ECC groups based on the configuration information.

5. The storage apparatus according to claim 1, wherein, when a new ECC group configured from low-performance disk drives that have a lower performance in comparison to the plurality of disk drives is added for allocating the plurality of storage areas to the first virtual volume, the controller rearranges the plurality of storage areas with an old access time in the plurality of storage areas in the ECC group of low-performance disk drives based on the configuration information.

6. The storage apparatus according to claim 1, further comprising a plurality of management units for managing the plurality of storage areas of the plurality of ECC groups configured from a plurality of external disk drives, wherein the controller rearranges the plurality of storage areas being used by the first virtual volume and being managed by each of the management units to become optimal among each of the management units based on the configuration information.

7. The storage apparatus according to claim 1, wherein the rearranging process is executed when a new ECC group is added to the storage apparatus.

8. The storage apparatus according to claim 1, wherein the rearranging process is executed in response to a request from the host system.

9. The storage apparatus according to claim 1, wherein the controller manages at least one of the plurality of storage areas allocated to at least one of the plurality of virtual storage areas of the first virtual volume as a first storage area and at least one of the plurality of storage areas allocated to at least one of the plurality of virtual storage areas of the second virtual volume as a second storage area.

10. A storage area arrangement method of a storage apparatus that provides a first virtual volume and a second virtual volume, each having a plurality of virtual storage areas to a host system comprising:

configuring a plurality of error correcting code (ECC) groups with a plurality of disk drives, each of the plurality of ECC groups being allocated a plurality of storage areas as a capacity from the plurality of disk drives;

allocating the capacity respectively from the plurality of ECC groups to at least one of the plurality of virtual storage areas of the first virtual volume and the second virtual volume dynamically in accordance with a received request from the host system;

managing configuration information that represents a first capacity, a second capacity, a third capacity, and a fourth capacity, the first capacity being a capacity allocated to the first virtual volume and belonging to a first ECC group, the second capacity being a capacity allocated to the first virtual volume and belonging to a second ECC group, the third capacity being a capacity allocated to the second virtual volume and belonging to the first ECC group, and the fourth capacity being a capacity allocated to the second virtual volume and belonging to the second ECC group; and executing a rearranging process in which:

comparing the first capacity to the second capacity, and if the first capacity is larger than the second capacity and a difference between the first capacity and the second capacity is larger than a threshold partially based on the configuration information, at least one storage area of a plurality of first storage areas is migrated to at least one storage area of a plurality of second storage areas in order to make the difference between the first capacity and the second capacity smaller, and comparing the third capacity to the fourth capacity, and if the third capacity is larger than the fourth capacity and a difference between the third capacity and the fourth capacity is larger than a threshold partially based on the configuration information, at least one storage area of a plurality of third storage areas is migrated to at least one storage area of a plurality of fourth storage areas in order to make the difference between the third capacity and the fourth capacity smaller.

11. The storage area arrangement method according to claim 10, wherein the plurality of storage areas in the ECC groups used by the first virtual volume is rearranged to become equal among the plurality of ECC groups based on the configuration information.

12. The storage area arrangement method according to claim 10, wherein the plurality of storage areas in the ECC groups accessed within a prescribed time is rearranged to become equal among the plurality of ECC groups based on the configuration information.

13. The storage area arrangement method according to claim 10, wherein the plurality of storage areas in the ECC groups not used by the first virtual volume is rearranged to become equal among the plurality of ECC groups based on the configuration information.

14. The storage area arrangement method according to claim 10, wherein when a new ECC group configured from low-performance disk drives that have a lower performance in comparison to the plurality of disk drives is added for allocating the plurality of storage areas to the first virtual volume, the plurality of storage areas with an old access time is rearranged in the storage areas in the ECC group of low-performance disk drives based on the configuration information.

15. The storage area arrangement method according to claim 10, wherein the plurality of storage areas being used by the first virtual volume and being managed by a plurality of management units for managing the plurality of storage areas of the plurality of ECC groups configured from a plurality of external disk drives is rearranged to become optimal among each of the management units based on the configuration information.

16. The storage area arrangement method according to claim 10, wherein the rearranging process is executed when a new ECC group is added to the storage apparatus.

17. The storage area arrangement method according to claim 10, wherein the rearranging process is executed in response to a request from the host system.

18. The storage area arrangement method according to claim 10, wherein the controller manages at least one of the plurality of storage areas allocated to at least one of the plurality of virtual storage areas of the first virtual volume as a first storage area and at least one of the plurality of storage areas allocated to at least one of the plurality of virtual storage areas of the second virtual volume as a second storage area.

* * * * *